United States Patent
Kim et al.

(10) Patent No.: US 11,785,617 B2
(45) Date of Patent: Oct. 10, 2023

(54) METHOD AND DEVICE FOR TRANSMITTING AND RECEIVING DOWNLINK CONTROL CHANNEL IN WIRELESS COMMUNICATION SYSTEM

(71) Applicant: LG ELECTRONICS INC., Seoul (KR)

(72) Inventors: Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/168,931

(22) Filed: Feb. 14, 2023

(65) Prior Publication Data

US 2023/0217461 A1 Jul. 6, 2023

Related U.S. Application Data

(63) Continuation of application No. PCT/KR2022/004765, filed on Apr. 4, 2022.
(Continued)

(30) Foreign Application Priority Data

Apr. 5, 2021 (KR) .................. 10-2021-0044142
Apr. 5, 2021 (KR) .................. 10-2021-0044290
(Continued)

(51) Int. Cl.
*H04W 72/12* (2023.01)
*H04W 72/232* (2023.01)
*H04L 1/00* (2006.01)

(52) U.S. Cl.
CPC ......... *H04W 72/232* (2023.01); *H04L 1/0061* (2013.01); *H04W 72/12* (2013.01)

(58) Field of Classification Search
CPC .... H04W 72/232; H04W 72/12; H04L 1/0061
See application file for complete search history.

(56) References Cited

U.S. PATENT DOCUMENTS

2017/0294997 A1  10/2017  Lee et al.
2019/0313390 A1  10/2019  Cheng
(Continued)

OTHER PUBLICATIONS

PCT International Application No. PCT/KR2022/004765, International Search Report dated Jul. 26, 2022, 4 pages.
(Continued)

*Primary Examiner* — John D Blanton
(74) *Attorney, Agent, or Firm* — LEE, HONG, DEGERMAN, KANG & WAIMEY PC

(57) ABSTRACT

A method performed by a terminal in a wireless communication system, according to one embodiment of the present disclosure, comprises: monitoring a physical downlink control channel (PDCCH) candidate in one or more of a first search space (SS) set on a first cell or a second SS set on a second cell; and receiving downlink control information (DCI) on the basis of the monitored PDCCH, wherein the second SS set is associated with cross-carrier scheduling for uplink transmission or downlink reception on the first cell, and the monitoring of the first SS set may not be performed on the first cell for the DCI format associated with a specific identifier on the basis of an overlap of at least a portion of a time domain resource unit associated with the first SS set and at least a portion of a time domain resource unit associated with the second SS set.

7 Claims, 14 Drawing Sheets

SS set index #X (PCell)

SS set index #Y (SCell)

Related U.S. Application Data

(60) Provisional application No. 63/315,499, filed on Mar. 1, 2022.

(30) Foreign Application Priority Data

| | | |
|---|---|---|
| Apr. 19, 2021 | (KR) | 10-2021-0050613 |
| Aug. 5, 2021 | (KR) | 10-2021-0103087 |
| Sep. 30, 2021 | (KR) | 10-2021-0129764 |
| Nov. 16, 2021 | (KR) | 10-2021-0157938 |

(56) References Cited

U.S. PATENT DOCUMENTS

| | | | |
|---|---|---|---|
| 2022/0053522 A1* | 2/2022 | MolavianJazi | H04L 1/1896 |
| 2022/0085939 A1* | 3/2022 | Mondal | H04L 5/0048 |
| 2022/0086765 A1* | 3/2022 | Zhang | H04W 52/50 |
| 2022/0086860 A1* | 3/2022 | Panteleev | H04W 4/40 |
| 2022/0095176 A1* | 3/2022 | Lim | H04W 36/14 |

OTHER PUBLICATIONS

Samsung, "Cross-carrier scheduling from SCell to PCell," R1-2008195, 3GPP TSG RAN WG1 #103-e, e-Meeting, Nov. 2020, 6 pages.

ZTE, "Discussion on Cross-Carrier Scheduling from SCell to PCell," R1-2100110, 3GPP TSG RAN WG1 Meeting #104-e, e-Meeting, Feb. 2021, 11 pages.

LG Electronics, "Discussion on cross-carrier scheduling from SCell to PCell," R1-2100885, 3GPP TSG RAN WG1 #104-e, e-Meeting, Feb. 2021, 7 pages.

* cited by examiner

METHOD AND DEVICE FOR TRANSMITTING AND RECEIVING DOWNLINK CONTROL CHANNEL IN WIRELESS COMMUNICATION SYSTEM

CROSS-REFERENCE TO RELATED APPLICATIONS

This application is a continuation of International Application No. PCT/KR2022/004765, filed on Apr. 4, 2022, which claims the benefit of earlier filing date and right of priority to Korean Patent Application Nos. 10-2021-0044142, filed on Apr. 5, 2021, 10-2021-0044290, filed on Apr. 5, 2021, 10-2021-0050613, filed on Apr. 19, 2021, 10-2021-0103087, filed on Aug. 5, 2021, 10-2021-0129764, filed on Sep. 30, 2021, and 10-2021-0157938, filed on Nov. 16, 2021, and also claims the benefit of U.S. Provisional Application No. 63/315,499, filed on Mar. 1, 2022, the contents of which are all hereby incorporated by reference herein in their entirety.

TECHNICAL FIELD

The present disclosure relates to a wireless communication system, and in more detail, relates to a method and an apparatus of transmitting or receiving a downlink control channel in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device of transmitting or receiving a downlink control channel in a wireless communication system.

An additional technical problem of the present disclosure is to provide a method and a device of transmitting or receiving a downlink control channel for supporting scheduling by a secondary cell for a primary cell in a wireless communication system.

The technical objects to be achieved by the present disclosure are not limited to the above-described technical objects, and other technical objects which are not described herein will be clearly understood by those skilled in the pertinent art from the following description.

A method of receiving a downlink channel by a terminal in a wireless communication system according to an aspect of the present disclosure includes monitoring a physical downlink control channel (PDCCH) candidate in at least one of a first search space (SS) set on a first cell or a second SS set on a second cell; and receiving downlink control information (DCI) based on a monitored PDCCH, and the second SS set is related to cross-carrier scheduling for uplink transmission or downlink reception on the first cell and based on overlapping of at least part of a time domain resource unit related to the first SS set and at least part of a time domain resource unit related to the second SS set, monitoring of the first set may not be performed on the first cell for a DCI format related to a specific identifier.

A method of transmitting a downlink channel by a base station in a wireless communication system according to an additional aspect of the present disclosure includes transmitting to a terminal configuration information on at least one of a first search space (SS) set on a first cell or a second SS set on a second cell; and transmitting to the terminal a PDCCH including downlink control information (DCI) in at least one of the first SS set or the second SS set, and the second SS set is related to cross-carrier scheduling for uplink transmission or downlink reception on the first cell and based on overlapping of at least part of a time domain resource unit related to the first SS set and at least part of a time domain resource unit related to the second SS set, monitoring of the first set may not be performed on the first cell by the terminal for a DCI format related to a specific identifier.

According to an embodiment of the present disclosure, a method and a device of transmitting or receiving a downlink control channel in a wireless communication system may be provided.

According to an embodiment of the present disclosure, a method and a device of transmitting or receiving a downlink control channel for supporting scheduling by a secondary cell for a primary cell in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
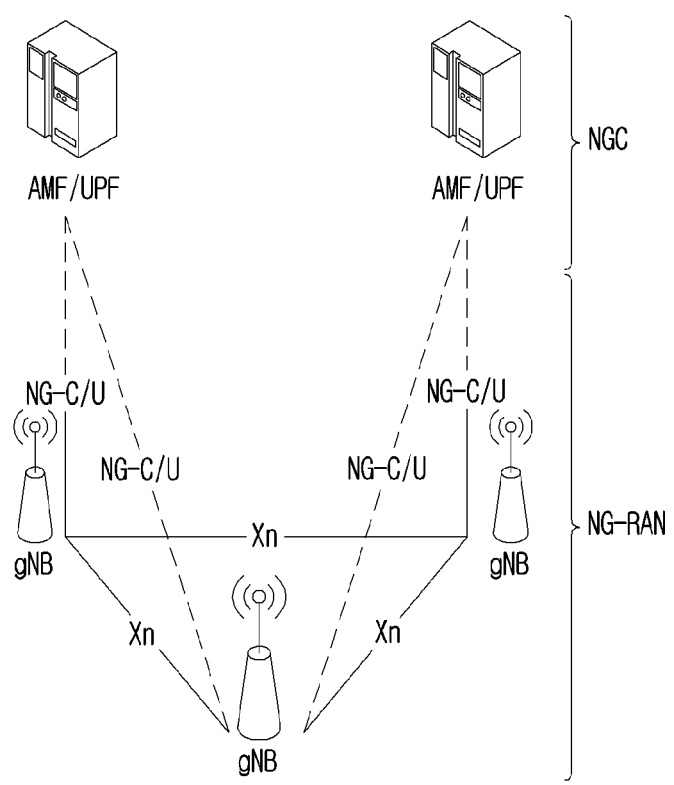
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
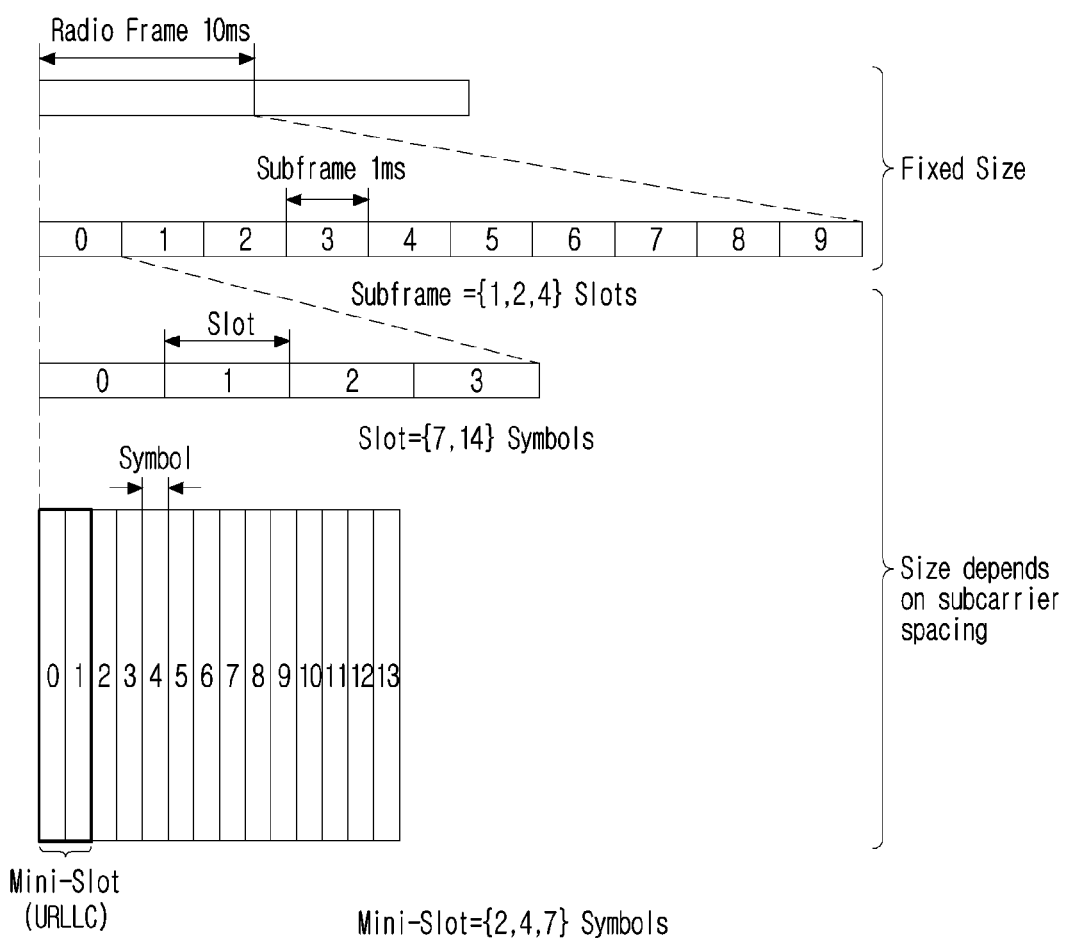
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |

TABLE 1-continued

| μ | Δf = $2^μ$ ·15 [kHz] | CP |
|---|---|---|
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz - 7125 MHz | 15, 30, 60 kHz |
| FR2 | 24250 MHz - 52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration slots are numbered in an increasing order of $n_s^\mu \in \{0, \ldots, N_{slot}^{subframe,\mu}-1\}$ in a subframe and are numbered in an increasing order of $n_s^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
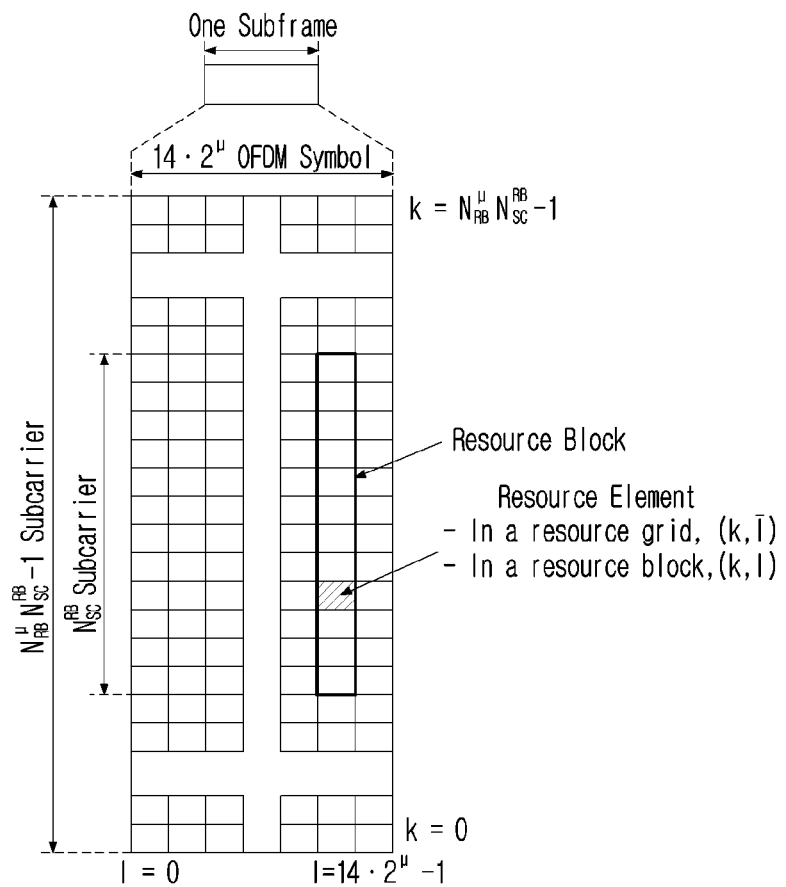
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $NRB^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and 1'=0, . . . , $2^\mu N_{symb}^{(\mu)}$ refers to a position of a symbol in a subframe. When referring to a resource element in a slot, an index pair (k,l) is used. Here, l=0, . . . , $N_{symb}^\mu-1$. A resource element (k,l') for p, and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
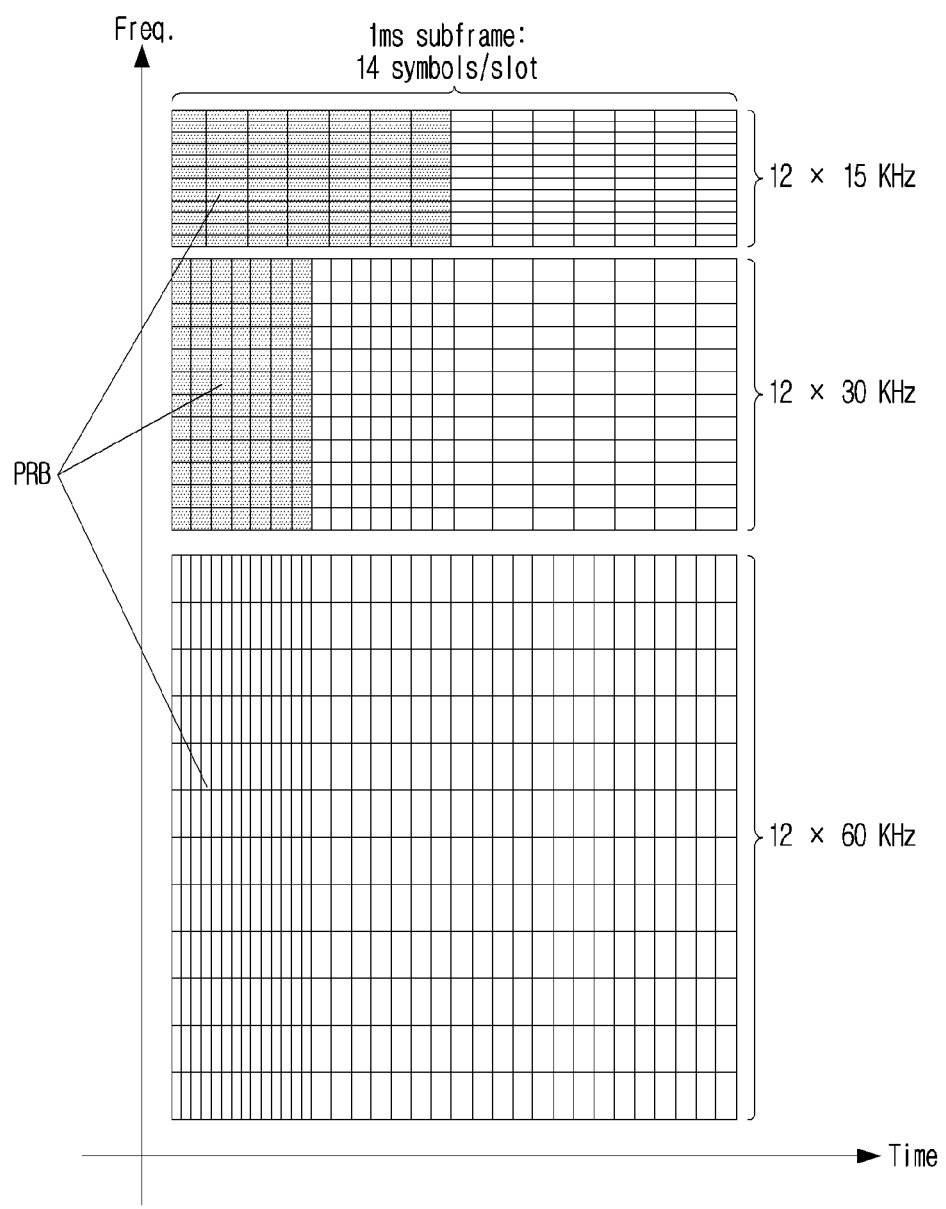
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
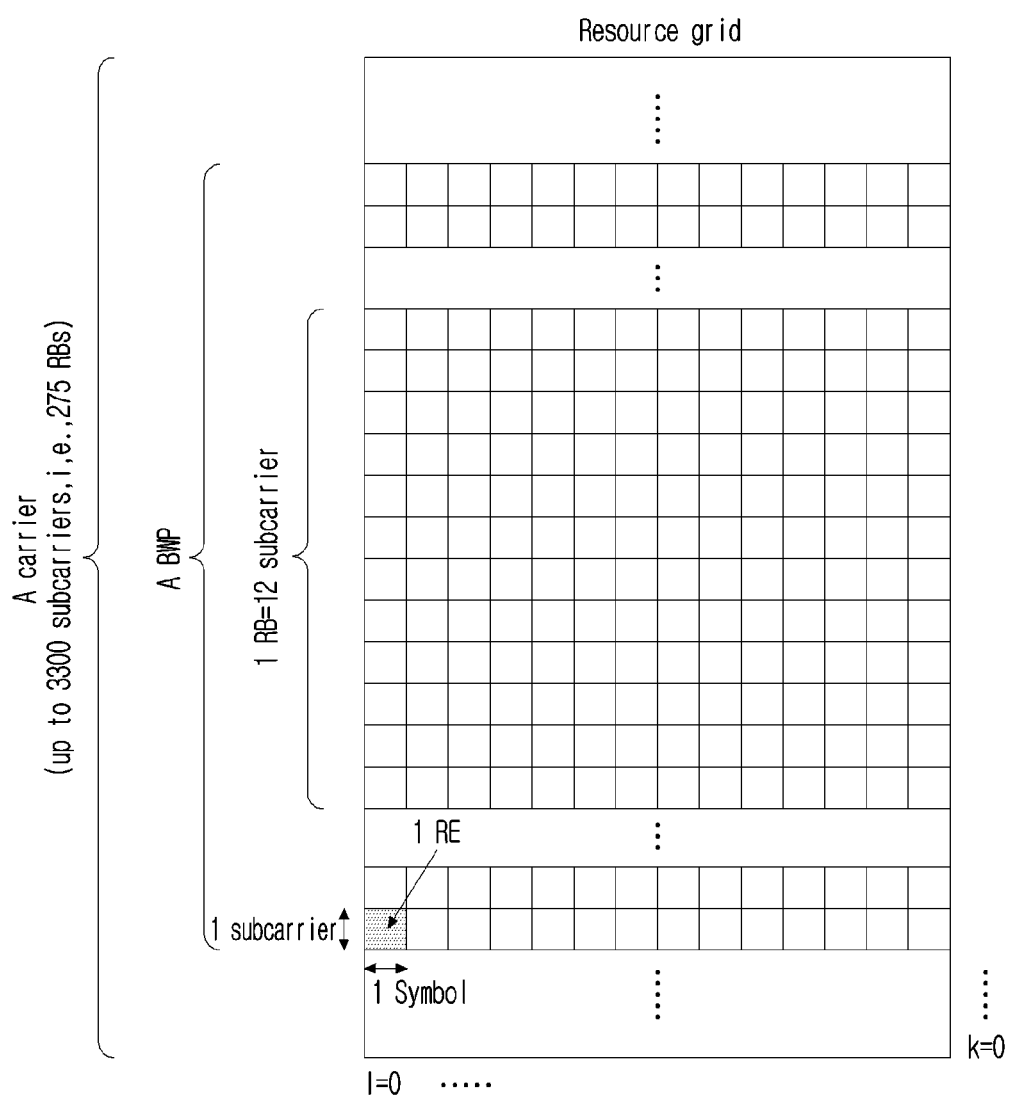
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth.

By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
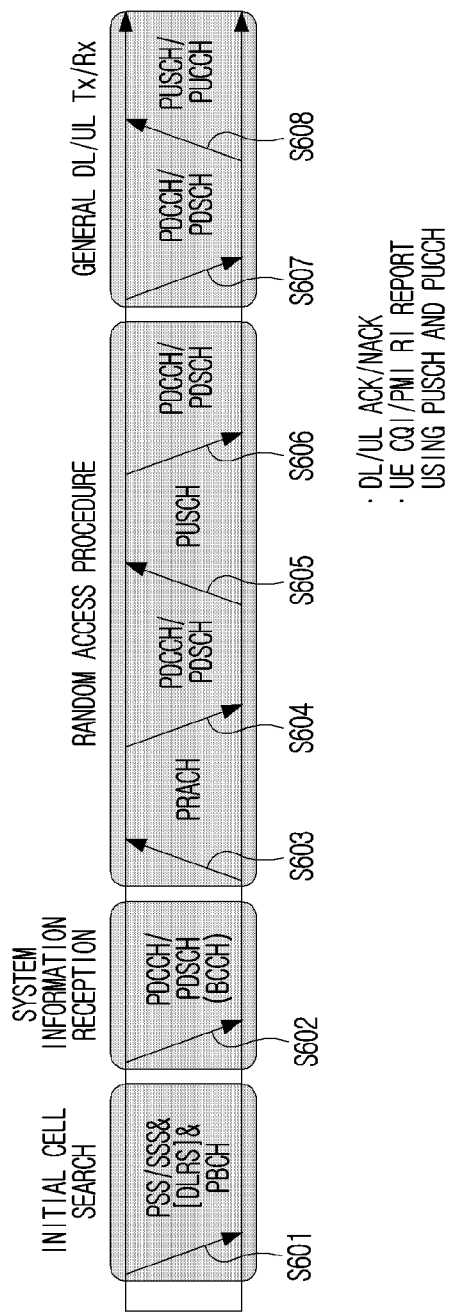
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block(TB)(e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Control Resource Set (CORESET)

A predetermined resource used for monitoring a downlink control channel (e.g., a PDCCH) may be defined based on a control channel element (CCE), a resource element group (REG) and a control resource set (CORESET). In addition, the predetermined resource may be defined as a resource which is not used for a DMRS associated with a downlink control channel.

A CORESET corresponds to a time-frequency resource which tries decoding of a control channel candidate by using one or more search spaces (SS). For example, a CORESET is defined as a resource that a terminal may receive a PDCCH and a base station does not necessarily transmit a PDCCH in a CORESET.

In a time-frequency domain, a size and a position of a CORESET may be configured semi-statically by a network. In a time domain, a CORESET may be positioned in any symbol in a slot. For example, a time length of a CORESET may be defined as up to 2 or 3 symbol durations. In a frequency domain, a CORESET may be positioned at a position of any frequency in an active bandwidth part (BWP) within a carrier bandwidth. A frequency size of a CORESET may be defined as a multiple of 6 RB units in a carrier bandwidth (e.g., 400 MHz) or less. A time-frequency position and size of a CORESET may be configured by RRC signaling.

A first CORESET (or CORESET 0) may be configured by a master information block (MIB) provided through a PBCH. A MIB may be obtained by a terminal from a network at an initial access step and a terminal may monitor a PDCCH including information scheduling system information block1 (SIB1) in CORESET 0 configured by a MIB. After a terminal is configured for connection, one or more CORESETs may be additionally configured through RRC signaling. An identifier may be allocated to each of a plurality of CORESETs. A plurality of CORESETs may be overlapped each other.

A PDSCH in a slot may be also positioned before starting or after ending a PDCCH in a CORESET. In addition, an unused CORESET resource may be reused for a PDSCH. For it, a reserved resource is defined, which may be overlapped with a CORESET. For example, one or more reserved resource candidates may be configured and each of reserved resource candidates may be configured by a bitmap in a time resource unit and a bitmap in a frequency resource unit. Whether a configured reserved resource candidate is activated (or whether it may be used for a PDSCH) may be dynamically indicated or may be semi-statically configured through DCI.

One CCE-to-REG mapping relationship may be defined for each CORESET. Here, one REG is a unit corresponding to one OFDM symbol and one RB (i.e., 12 subcarriers). One CCE may correspond to 6 REGs. A CCE-to-REG mapping relationship of a different CORESET may be the same or may be configured differently. A mapping relationship may be defined in a unit of a REG bundle. A REG bundle may correspond to a set of REG(s) that a terminal assumes consistent precoding will be applied. CCE-to-REG mapping may include or may not include interleaving. For example, when interleaving is not applied, a REG bundle configured with 6 consecutive REGs may form one CCE. When interleaving is applied, a size of a REG bundle may be 2 or 6 when a time duration length of a CORESET is 1 or 2 OFDM symbols and a size of a REG bundle may be 3 or 6 when a time duration length of a CORESET is 3 OFDM symbols. A block interleaver may be applied so that a different REG bundle will be dispersed in a frequency domain and mapped to a CCE. The number of rows of a block interleaver may be variably configured for a variety of frequency diversities.

In order for a terminal to receive a PDCCH, channel estimation using a PDCCH DMRS may be performed. A PDCCH may use one antenna port (e.g., antenna port index 2000). A PDCCH DMRS sequence is generated across the entire common resource block in a frequency domain, but it may be transmitted only in a resource block that an associated PDCCH is transmitted. Meanwhile, before a terminal obtains system information in an initial access process, a position of a common resource block may not be known, so for CORESET 0 configured by a MIB provided through a PBCH, a PDCCH DMRS sequence may be generated from a first resource block of CORESET 0. A PDCCH DMRS may be mapped to every fourth subcarrier in a REG. A terminal may perform channel estimation in a unit of a REG bundle by using a PDCCH DMRS.

Search Space (SS)

DCI in various formats or in various sizes may be used in PDCCH transmission and a terminal may perform blind detection or blind decoding for DCI by monitoring a PDCCH candidate based on a predetermined DCI format. A different DCI format may not necessarily have a different DCI size. Search space (SS) may be defined to limit the number of PDCCH candidates which should be monitored by a terminal.

Search space may be a set of control channel candidates corresponding to CCE(s) according to a predetermined aggregation level. For example, an aggregation level may be defined as 1, 2, 4, 8 or 16 and a PDCCH may be configured with a set of CCE(s) corresponding to an aggregation level. One or more CORESETs may be configured for a terminal and one or more search space may be configured for each CORESET. The number of PDCCH candidates may be configured per search space or per aggregation level.

Search space may include terminal-specific search space and common search space shared by multiple terminals. In terminal-specific search space, a terminal may try decoding of a PDCCH candidate based on a terminal-specific identifier (e.g., a C-RNTI). In common search space, a terminal may try decoding of a PDCCH candidate based on an identifier for a specific purpose (e.g., a SI(System Information)-RNTI, a P(Paging)-RNTI, a RA(Random Access)-RNTI, etc.), not a unique identifier. A CCE set for common search space may be predefined.

A terminal may try decoding of a PDCCH candidate for corresponding search space at a monitoring occasion (MO) configured for search space. In trying decoding of a PDCCH candidate, a terminal may process information transmitted through a PDCCH when it succeeds in CRC check based on an available RNTI, and it may ignore it by determining that it is information which is intended by other terminal or that an error exists when it fails in CRC check.

One search space (SS) may correspond to one monitoring occasion (MO) and one search space set (SS set) may correspond to a set of MOs. In addition, one SS set may define a time position that a CORESET associated with it exists (e.g., a period and/or an offset). In other words, a terminal may perform blind decoding for a PDCCH in a CORESET existing based on a period/an offset corresponding to a SS set. For example, MO 1 may exist repetitively in a period corresponding to SS set 1 and MO 2 may exist repetitively in a period corresponding to SS set 2. In addition, one CORESET may be associated with one or more (e.g., up to 10) SS sets, but one SS set may be associated only with one CORESET.

In addition, a CORESET is defined as a predetermined time-frequency resource in one time unit (e.g., a slot) and a space parameter (e.g., a TCI state, or a QCL RS) may be configured for each CORESET.

In addition, in relation to a blind decoding (BD) for a downlink control channel (e.g., PDCCH), an upper limit or a budget for at least one of the number of BDs or the number of CCEs (or the number of aggregated CCEs) in a predetermined time unit (e.g., one slot) may be configured. Such upper limit/budget may be related to the capability (e.g., processing speed) of the terminal. When the number of BD/CCE counted by the terminal within a predetermined time unit exceeds the upper limit, some SS set may be dropped. That is, the terminal may not attempt PDCCH monitoring/detection/blind decoding in the CORESET corresponding to the some SS set within the predetermined time unit.

Carrier Aggregation

A wireless communication system may support carrier aggregation (CA). For example, a 3GPP LTE or NR system may collect a plurality of uplink/downlink (UL/DL) component carriers (CC) to support a wider UL/DL bandwidth. Each CC may be adjacent each other or non-adjacent in a frequency domain. A bandwidth of each CC may be determined independently. Asymmetric carrier aggregation in which the number of UL CCs and the number of DL CCs are different is also possible.

When carrier aggregation is applied, one specific CC supporting a basic operation may be referred to as a primary CC (PCC) and at least one additional CC may be referred to as a secondary CC (SCC). Only a UL may be configured, only a DL may be configured or a UL and a DL may be configured for one CC.

A control channel (e.g., a PDCCH) including scheduling information for UL/DL data channel (e.g., a PUSCH/a PDSCH) transmission or reception in a specific CC may be transmitted in a corresponding specific CC. It may be referred to as self-carrier scheduling (or simply, self-scheduling) to distinguish from cross-carrier scheduling (CCS) (or simply cross-scheduling) which is described later.

When cross-carrier scheduling (CCS) or cross-scheduling is applied, for example, a PDCCH for downlink allocation may be transmitted to DL CC#0 and a corresponding PDSCH may be transmitted to DL CC#2. For CCS, a carrier indicator field (CIF) may be used. A configuration for presence or absence of a CIF in a PDCCH (or DCI) may be semi-statically enabled or disabled by higher layer signaling (e.g., RRC signaling) in a terminal-specific (or terminal group-specific) manner.

When a CIF is disabled, a PDCCH on a DL CC may allocate a PDSCH resource on the same DL CC or a PUSCH resource on one UL CC linked to the same DL CC. In this case, a CIF may not be included in DCI.

When a CIF is enabled, a PDCCH on a DL CC may allocate a PDSCH or PUSCH resource on one DL/UL CC indicated by a CIF among a plurality of aggregated DL/UL CCs. For a DCI format including a CFI, a CIF field in a x-bit (e.g., x=3) size may have a fixed position in DCI regardless of a DCI format size.

When a CIF exists/is applied, a base station may allocate a monitoring DL CC (or a DL CC set) to reduce PDCCH blinding decoding (BD) complexity at a terminal side. For PDSCH/PUSCH scheduling, a terminal may perform PDCCH detection/decoding only in a corresponding DL CC (set). In addition, a base station may transmit a PDCCH only through a monitoring DL CC (set). A monitoring DL CC set may be configured in a terminal-specific, terminal-group-specific, or cell-specific manner.

For example, it is assumed that 3 DL CCs are aggregated and DL CC A is configured as a PDCCH monitoring CC. When a CIF is disabled, each DL CC may transmit only a PDCCH scheduling its PDSCH (i.e., self-carrier scheduling). When a CIF is enabled by terminal-specific (or terminal-group-specific, or cell-specific) higher layer signaling, a specific CC (e.g., DL CC A) may transmit a PDCCH scheduling a PDSCH of other CC as well as a PDCCH scheduling a PDSCH of DL CC A by using a CIF (i.e., cross-carrier scheduling). A PDCCH may not be transmitted in DL CC B and C.

In the present disclosure, definition of a term related to a cell is as follows. In the present disclosure, a cell may be interpreted in a context and for example, it may mean a serving cell. In addition, a cell may be configured with 1 DL CC and 0 to 2 UL CCs. For example, a cell may be configured with 1 DL CC and 1 UL CC.

A primary cell (PCell) corresponds to a cell which operates on a primary frequency (i.e., a frequency that a terminal performs establishment/reestablishment for initial access) for a terminal that carrier aggregation (CA) is configured. For a dual connectivity (DC) operation, a cell which operates on a primary frequency among master cell groups (MCG) corresponds to a primary cell.

A secondary cell (SCell) corresponds to a cell which provides an additional wireless resource for a SpCell for a terminal that carrier aggregation (CA) is configured.

A primary secondary cell (PSCell) (or a primary SCG cell), for a DC operation, corresponds to a cell which performs random access when a terminal performs reconfiguration with a synchronization process among secondary cell groups (SCG).

A special cell (SpCell), for a DC operation, refers to a PCell of a MCG or a PSCell of a SCG. When it is not a DC operation, a SpCell refers to a PCell.

Only one serving cell (ServCell) exists for a terminal in a RRC CONNECTED state that CA/DC is not configured and a corresponding cell corresponds to a primary cell. For a terminal in a RRC CONNECTED state that CA/DC is configured, serving cells refer to a set of cells including all SCells and SpCell(s).

SCell-to-PCell CCS

For smooth transfer from the existing 3GPP LTE service to 5G NR service, a 5G NR service of a corresponding base station may be provided through improvement of a software side for a base station that the existing LTE service is provided. In this case, a base station may service both a LTE and NR system in a specific band and for a terminal, the existing LTE terminal may receive a LTE service and a 5G NR terminal may receive a NR service. For example, a situation may be assumed that a base station has carrier#1 (e.g., 1.8 GHz) that a LTE and NR system are operated together and carrier#2 (e.g., 3.5 GHz) that only a NR system is operated and a NR terminal which communicates with a corresponding base station simultaneously accesses through carrier aggregation (CA) between carrier#1 and carrier#2. Here, if a wide coverage, a characteristic of low frequency, is considered, it may be desirable to configure carrier#1 as a PCell.

In carrier #1, which is a PCell, a base station may have to provide a LTE service together with a NR service. Providing a LTE service means that an always-on signal like a cell-specific reference signal (CRS) may be transmitted and PDCCH transmission may be reserved for first some symbols of every subframe. When providing a NR service while providing essential matters for the above-described LTE service on carrier #1, a base station may not have enough space of a wireless resource to transmit a PDCCH for a NR terminal only on carrier #1. In order to overcome such a problem, a method of transmitting scheduling information for DL/UL data to be transmitted in a PCell (hereinafter, DL DCI/UL DCI) on a SCell may be considered. In other words, transmission on a SCell may be allowed without a limit that control information such as DCI is transmitted only in a PCell.

For example, when DCI scheduling a PDSCH or a PUSCH to be transmitted on a PCell is transmitted on a SCell, PDCCH transmission may be offloaded from a PCell to a SCell. As such, a configuration for cross-carrier scheduling (i.e., SCell-to-PCell CCS) that scheduling information on an UL/DL channel scheduled on a PCell is provided on a SCell may include configuring a scheduling cell as a SCell and configuring a scheduled cell as a PCell.

As such, considering that a PDCCH resource on a NR PCell may be insufficient from a perspective of a base station supporting LTE and NR at the same time, SCell-to-PCell CCS for dynamic spectrum sharing (DSS) may be supported. In addition, considering a characteristics of initial access, broadcast data transmission or reception, etc., even when SCell-to-PCell CCS is configured by a terminal, a terminal may need to perform PDCCH monitoring for some search spaces (e.g., a common search space (CSS)) in a PCell. For example, when SCell-to-PCell CCS is configured, for a PCell which is one scheduled cell, a PCell which is a scheduling cell (at least for CSS monitoring) and a SCell which is a scheduling cell (for terminal-specific search space (USS) monitoring) may coexist.

In the present disclosure, with regard to a SCell-to-PCell CCS configuration, support and an operation method thereof, specific examples for reducing complexity of terminal implementation are included.

In the following description, it is described by assuming a PCell and a SCell for clarity, but in the following examples, a PCell may be replaced with a SpCell (i.e., a PCell and/or a PSCell).

Self-scheduling and cross-scheduling in a NR system are described below. In the following description, a term of a cell may be replaced with a BWP or an active BWP of a corresponding cell.

PDCCH monitoring corresponding to a search space set (a SS set) configured for a scheduled cell is performed at a PDCCH monitoring occasion (MO) associated with a SS set having the same index as a corresponding SS set in a scheduling cell. A PDCCH MO (e.g., a time resource for PDCCH monitoring), for example, may be determined based on a SS set configuration such as PDCCH monitoring periodicity (e.g., periodicity in a slot unit), a PDCCH monitoring offset (e.g., an offset in a slot unit) and a PDCCH monitoring pattern in a slot (e.g., a position of a first symbol of a CORESET in a slot), etc. A PDCCH MO may be determined per SS set s in CORESET p. 10 or less SS sets may be linked to one CORESET and each SS set may be identified by a SS set index.

Figure 7:
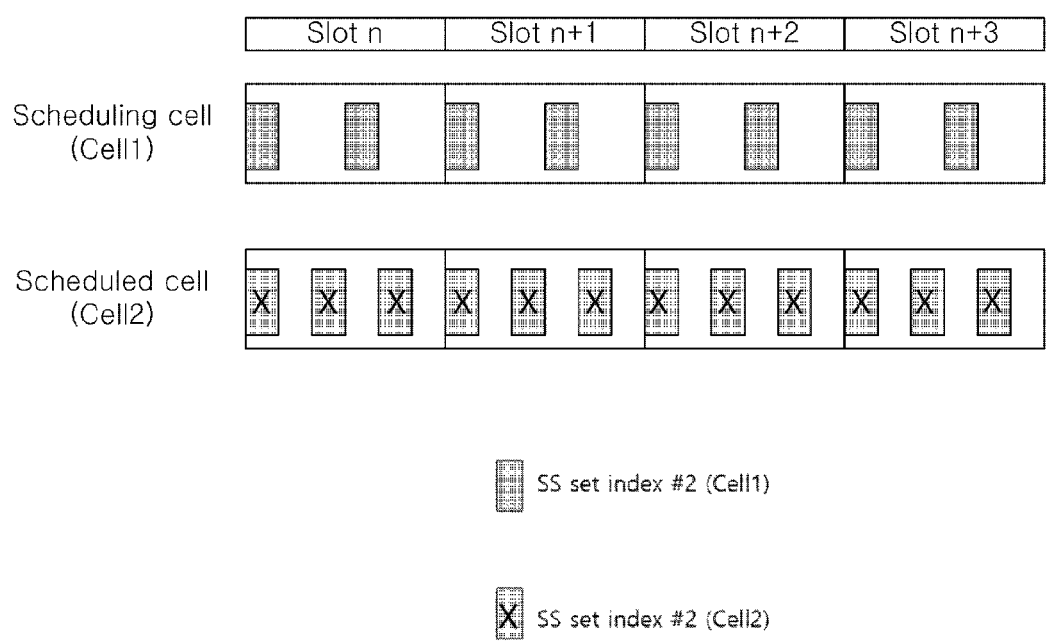
FIG. 7 is a diagram for describing PDCCH monitoring related to cross-carrier scheduling to which the present disclosure may be applied.

FIG. 7 is a diagram for describing PDCCH monitoring related to cross-carrier scheduling to which the present disclosure may be applied.

In an example of FIG. 7, it is assumed that a scheduling cell for a second cell (cell2), a scheduled cell, is configured as a first cell (cell1). In this case, monitoring for a DCI format associated with SS set index #2 of cell 2 may be performed at a PDCCH MO configured for SS set index #2 of cell1. The number of PDCCH candidates per each aggregation level (AL) may be configured through a parameter (e.g., nrofCandidates or nrofCandidates-SFI (slot format indicator)) for the number of candidates among higher layer configuration parameters for a SS set. The number of corresponding PDCCH candidates follows a value configured for a SS set (having the same index as a corresponding SS set on a scheduling cell) on a scheduled cell, not a value configured for a SS set on a scheduling cell.

Even when cross-carrier scheduling (i.e., SCell-to-PCell CCS) that scheduling information for an UL/DL channel scheduled on a PCell is provided on a SCell is configured, all or part of a common search space (CSS) on a PCell may operate an UL/DL channel on a PCell by a self-scheduling (i.e., PCell-to-PCell self-scheduling) method. In addition, self-scheduling may be applied/configured/indicated for all or part of a terminal-specific search space (USS) set and cross-scheduling may be applied/configured/indicated for all or part of the remaining. As such, a plurality of scheduling cells (i.e., PCell and SCell(s)) may exist simultaneously for one scheduled cell (i.e., a PCell).

In a process in which a terminal receives control information, PDCCH allocation may be determined. With this regard, for one serving cell, for a DL BWP that specific subcarrier spacing (SCS) index p, is configured, the maximum number (e.g., when a time unit is a slot, $M^{max,slot,\mu}_{PDCCH}$) of PDCCH candidates monitored per predetermined time unit (e.g., a slot, a slot group, etc.) may be predefined/preconfigured for a terminal. In addition, for one serving cell, for a DL BWP that specific SCS index p, is configured, the maximum number (e.g., when a time unit is a slot, $C^{max,slot,\mu}_{PDCCH}$) of non-overlapped CCEs for PDCCH candidates expected to be monitored by a terminal in a predetermined time unit (e.g., a slot, a slot group, etc.) may be predefined/preconfigured for a terminal. For example, $M^{max,slot,\mu}_{PDCCH}$ may be given as 44, 36, 22, 20 respectively for $\mu=0, 1, 2, 3$. For example, $C^{max,slot,\mu}_{PDCCH}$ may be given as 56, 56, 48, 32 respectively for $\mu=0, 1, 2, 3$.

The present disclosure, when CCS that a scheduled cell is a PCell (or a PSCell) is configured, includes a method of calculating the number of PDCCH candidates and/or the number of non-overlapped CCEs, and various examples of a rule/a priority related to PDCCH candidate/SS set drop caused by overbooking that the number of PDCCH candidates (and/or the number of non-overlapped CCEs) exceeds the maximum number of PDCCH candidates (and/or the maximum number of non-overlapped CCEs).

A rule/a priority for SS set drop as above may be defined by a pseudocode as in Table 6. Such a pseudocode is just an example and a scope of the present disclosure is not limited thereto. In addition, an example of a pseudocode as in Table 6, for each scheduling cell (i.e., PCell and SCell(s)), for each numerology (or SCS), may be applied based on a specific cell, or based on a specific numerology (or SCS).

For example, for a CSS set, a terminal may monitor $M^{CSS}_{PDCCH}$ candidates requiring a total of $C^{CSS}_{PDCCH}$ non-overlapped CCEs. In addition, a terminal may allocate to a USS set a PDCCH candidate which will be monitored according to a pseudocode in Table 6.

TABLE 6

Denote by $V_{CCE}(S_{uss}(j))$ the set of non-overlapping CCEs for
  search space set $S_{uss}(j)$ and by $C(V_{CCE}(S_{uss}(j)))$;
the cardinality of $V_{CCE}(S_{uss}(j))$ where the non-overlapping
CCEs for search space set $S_{uss}(j)$ are determined considering
the allocated PDCCH candidates for monitoring for the CSS
sets and the allocated PDCCH candidates for
  monitoring for all search space sets $S_{uss}(k)$, $0 \leq k \leq j$.
Set $M^{uss}_{PDCCH} = \min(M^{max,slot,\mu}_{PDCCH}, M^{total,slot,\mu}_{PDCCH}) - M^{css}_{PDCCH}$
Set $C^{uss}_{PDCCH} = \min(C^{max,slot,\mu}_{PDCCH}, C^{total,slot,\mu}_{PDCCH}) - C^{css}_{PDCCH}$
Set $j = 0$
while $\Sigma_L M_{S_{uss}(j)}(L) \leq M^{uss}_{PDCCH}$ AND $C(V_{CCE}(S_{uss}(j))) \leq C^{uss}_{PDCCH}$
  allocate $\Sigma_L M_{S_{uss}(j)}^{(L)}$ PDCCH candidates for monitoring to
  USS set $S_{uss}(j)$
  $M^{uss}_{PDCCH} = M^{uss}_{PDCCH} - \Sigma_L M_{S_{uss}(j)}^{(L)}$;
  $C^{uss}_{PDCCH} = C^{uss}_{PDCCH} - C(V_{CCE}(S_{uss}(j)))$;
  $j = j + 1$ ;
end while A process of Table 6 may be largely described in the following 3 steps.

Step 1: Based on specific μ, calculate the maximum value of the number of PDCCH candidates ($M^{max,slot,\mu}_{PDCCH}$), the total number of PDCCH candidates ($M^{total,slot,\mu}_{PDCCH}$), the maximum number of non-overlapped CCEs ($C^{max,slot,\mu}_{PDCCH}$) and the total number of non-overlapped CCEs ($C^{total,slot,\mu}_{PDCCH}$) per predetermined time unit (e.g., a slot) Hereinafter, for clarity of indication, a $C^{max,slot,\mu}_{PDCCH}$ or $M^{total,slot,\mu}_{PDCCH}$ value may be referred to as M_mu and when there is no separate restriction, the same rule may be applied to all of two values. In addition, a $C^{max,slot,\mu}_{PDCCH}$ or $C^{total,slot,\mu}_{PDCCH}$ value may be referred to as C_mu and when there is no separate restriction, the same rule may be applied to all of two values.

Step 2: Determine the number of PDCCH candidates (i.e., $M^{CSS}_{PDCCH}$) and the number of non-overlapped CCEs (i.e., $C^{CSS}_{PDCCH}$) for CSS set(s) In addition, determine the number of PDCCH candidates (i.e., $M^{CSS}_{PDCCH}$) and the number of non-overlapped CCEs (i.e., $C^{CSS}_{PDCCH}$) for USS set(s) In addition, determine the number of PDCCH candidates (i.e., $\Sigma_L M^{(L)}_{S_{uss}(j)}$ for USS set index j) and the number of non-overlapped CCEs (i.e., $C(V_{CCE}(S_{USS}(j)))$ for USS set index j) for USS set(s)

Step 3: Configure {a difference between the number of PDCCH candidates for CSS set(s) and M_mu} and {a difference between the number of non-overlapped CCEs for CSS set(s) and C mu} as a budget, review whether a corresponding budget is satisfied in a specific time unit (e.g., a slot) in order from a USS set of a lowest index and exclude (or drop) unsatisfied USS set(s) from monitoring in a corresponding time unit In the above description, a USS and/or CSS dropped from PDCCH monitoring may vary depending on which a numerology/SCS (i.e., µ or mu) value is used as a standard to determine M_mu and C_mu. Accordingly, when cross-scheduling that a PCell is a scheduled cell is applied, a clear method or standard for which mu value is used as a standard to determine M_mu and C_mu in step 1 of a description related to Table 2 is described through the present disclosure. In addition, a clear method or standard for determining the number of PDCCH candidates and the number of non-overlapping CCEs for a CSS/USS set in step 2 of a description related to Table 2 based on a clearly determined mu value is described through the present disclosure.

An expression which is commonly applied in the following examples is as follows.

Scheduling DCI for Cell #A: DCI which includes scheduling information for PDSCH reception or PUSCH transmission in Cell #A For example, PUSCH scheduling corresponds to DCI (format) 0_X and PDSCH scheduling corresponds to DCI (format) 1_X (here, X is 0 to 2).

Receive cross-carrier scheduling information for Cell #A: In order to detect/receive scheduling information for Cell #A, detect/receive scheduling DCI in a scheduling cell for Cell #A For example, when receiving CCS information for a PCell on a SCell, it means that scheduling DCI is detected/received in a scheduling Scell for a PCell in order to detect/receive scheduling information for PCell #A.

Receive self-carrier scheduling information for Cell #A: In order to detect/receive scheduling information for Cell #A, detect/receive scheduling DCI in Cell #A In some description, self-carrier scheduling and subcarrier spacing may be expressed by the same abbreviation SCS, but they may be clearly distinguished in context, and self-carrier scheduling is mainly described as a full term or as self-scheduling.

Unless confused in a different meaning in the following example, a PCell which is a scheduled cell and a scheduling SCell (i.e., a sSCell) may be expressed as a scheduled cell and a scheduling cell, respectively. A scope of the present disclosure includes application of the following examples for a general scheduled cell and scheduling cell (i.e., not limited to a PCell or a SCell).

A first basic example is about a method of calculating the number of non-overlapped CCEs and/or the number of PDCCH candidates which may be monitored when a scheduling cell for a PCell, a scheduled cell, is a SCell (i.e., cross-scheduling) and a PCell (i.e., self-scheduling).

Even when SCell-to-PCell cross-carrier scheduling (CCS) is configured, PCell-to-PCell self-carrier scheduling (SCS) may be also applied to (some) common search space (CSS) set/terminal-specific search space (USS), etc. In this case, the number of non-overlapped CCEs and/or the number of PDCCH candidates (per predetermined time unit) allowed for a plurality of scheduling cells (i.e., PCell and sSCell) corresponding to a PCell, one scheduled cell, (e.g., $M^{max,slot,\mu}_{PDCCH}$, $M^{total,slot,\mu}_{PDCCH}$, $C^{max,slot,\mu}_{PDCCH}$, $C^{total,slot,\mu}_{PDCCH}$) may be calculated as follows.

As a first method, all scheduling cells may be included in $N^{DL,\mu}_{cells,X}$ (X may be 0 or 1 and when X is omitted, it is applied to both of X=0, 1). A cell corresponding to X=0 may be associated with the same CORESETPoolIndex (or a single TRP) and a cell corresponding to X=1 may be associated with different CORESETPoolIndex (or multi-TRPs). For example, a first set of a DL cell corresponding to X=0 may correspond to a case in which CORESETPoolIndex of a single value for all CORESETs is provided or CORESETPoolIndex is not provided on all DL BWPs of each scheduling cell from a cell of a first set. For example, a second set of a DL cell corresponding to X=1 may correspond to a case in which CORESETPoolIndex of a first value for a first CORESET is provided or CORESETPoolIndex is not provided on a DL BWP of each scheduling cell from a cell of a second set. A terminal calculates the number of serving cells as the number of cells of a first set + the number of cells of a second set and here, R may be determined as a value of 1 or 2 according to terminal capability and reported to a base station.

For example, when it is assumed that CA is performed for a total of 2 15 kHz SCS cells including a 15 kHz ($\mu$=0) PCell and 4 30 kHz ($\mu$=1) cells (i.e., when CA is performed for 6 CCs), it may be $N^{DL,0}_{cells,0}$=2, $N^{DL,1}_{cells,0}$=4. Here, when one of 30 kHz SCells is configured as a scheduling cell for a PCell, it may be $N^{DL,0}_{cells,0}$=2, $N^{DL,1}_{cells,0}$=5 according to a first method.

Such a method may be applied equally to a value of $N^{DL,\mu}_{cells,X}$ used to calculate the number of $N^{cap}_{cells}$. Here, $N^{cap}_{cells}$ may correspond to the number of DL cells which is applied in a terminal capability determination on the maximum number of PDCCH candidates and the maximum number of non-overlapped CCEs.

As a second method, even when a scheduling cell corresponding to a PCell is two cells, a PCell and a SCell, a certain ratio (P1(0≤P1≤1) for a PCell, S1 (0≤S1≤1) for a SCell, P1+S1=1) may be applied to each cell. Here, a value of P1 and S1 may be a value which is predefined and applied without signaling between a base station and a terminal or is configured/indicated by a base station to a terminal or is reported by a terminal to a base station. For example, it may be P1=S1=0.5. Accordingly, the total number of scheduling cells may be maintained.

For example, when it is assumed that CA is performed for a total of 2 15 kHz cells including a 15 kHz PCell and 4 30 kHz cells (i.e., when CA is performed for 6 CCs), it may be $N^{DL,0}_{cells,0}$=2, $N^{DL,1}_{cells,0}$=4. Here, when one of 30 SCS SCells is configured as a scheduling cell for a PCell, it may be $N^{DL,0}_{cells,0}$=1+P1(or $N^{DL,0}_{cells,0}$=2-P1 (or $N^{DL,1}_{cells,0}$=5-S1) according to a second method.

Such a method may be applied equally to a value of $N^{DL,\mu}_{cells,X}$ used to calculate the number of $N^{cap}_{cells}$. Here, $N^{cap}_{cells}$ may correspond to the number of DL cells which is applied in a terminal capability determination on the maximum number of PDCCH candidates and the maximum number of non-overlapped CCEs.

One case, i.e., a case in which the cumulative sum of $N^{DL,\mu}_{cells,0}+\gamma^* N^{DL,\mu}_{cells,1}$ for all $\mu$ (e.g., $\Sigma_{\mu=0}^{3}(N^{DL,\mu}_{cells,0}+\gamma \cdot N^{DL,\mu}_{cells,1}$ or less is assumed. In this case, for both of the above-described first and second method, the maximum number of PDCCH candidates and/or the maximum number of non-overlapped CCEs per numerology (or $\mu$) and per scheduling cell may be determined. In other words, for X=0, it may be $M^{total,slot,\mu}_{PDCCH}=M^{max,slot,\mu}_{PDCCH}$, and $C^{total,slot,\mu}_{PDCCH}=C^{max,slot,\mu}_{PDCCH}$ and for X=1, may be $M^{total,slot,\mu}_{PDCCH}=\gamma^* M^{max,slot,\mu}_{PDCCH}$, and $C^{total,slot,\mu}_{PDCCH}=\gamma^* C^{max,slot,\mu}_{PDCCH}$. Here, $\gamma$ may be 1 or may be determined as R. Alternatively, when a second method is applied to a PCell, a scheduled cell, (or also in a first method), it may be determined as P1 times the maximum number of PDCCH candidates and/or the maximum number of non-overlapped CCEs defined based on a numerology of a PCell or S1 times the maximum number of PDCCH candidates and/or the maximum number of non-overlapped CCEs defined based on a numerology of a SCell, one of scheduling cells (here, a value of P1 and S1 may be the same as or different from a value of P1 and S1 in the second method). Here, a value of P1 and S1 may be predefined (commonly with or separately from a value of P1 and S1 in the second method) or may be configured/indicated by a base station or may be reported by a terminal. For example, it may be P1=S1=0.5.

For example, when a SCell having a numerology of $\mu\_s$ is a scheduling cell and a PCell having a numerology of $\mu\_p$ is a scheduled cell (here, $\mu\_s$ and $\mu\_p$ may be the same or different), the maximum number of PDCCH candidates and/or the maximum number of non-overlapped CCEs may be determined in proportion to a value of P1 and S1. For PCell-to-PCell self-scheduling, it may be $M^{total,slot,\mu\_p}_{PDCCH}=P1*M^{max,slot,\mu\_p}_{PDCCH}$, and $C^{total,slot,\mu\_p}_{PDCCH}=P1*C^{max,slot,\mu\_p}_{PDCCH}$ for X=0 and it may be $M^{total,slot,\mu\_p}_{PDDCH}=\gamma*P1*M^{max,slot,\mu\_p}_{PDCCH}$, and $C^{total,slot,\mu\_p}_{PDCCH}=\gamma*P1*C^{max,slot,\mu\_p}_{PDCCH}$ for X=1. For a value determined on a SCell for SCell-to-PCell cross-scheduling, it may be $M^{total,slot,\mu\_s}_{PDCCH}=S1*M^{max,slot,\mu\_s}_{PDDCH}$, and $C^{total,slot,\mu\_s}_{PDCCH}=S1*C^{max,slot,\mu\_s}_{PDCCH}$ for X=0 and it may be $M^{total,slot,\mu\_s}_{PDCCH}=\gamma*S1*M^{max,slot,\mu\_s}_{PDCCH}$, and $C^{total,slot,\mu\_s}_{PDCCH}=\gamma*S1*C^{max,slot,\mu\_s}_{PDCCH}$ for X=1. In other words, a terminal does not need to perform PDCCH monitoring exceeding $M^{total,slot,\mu\_p}_{PDCCH}$ and/or $C^{total,slot,\mu\_p}_{PDCCH}$ for PCell-to-PCell self-scheduling. In addition, a terminal does not need to perform PDCCH monitoring exceeding $M^{total,slot,\mu\_s}_{PDCCH}$ and/or $C^{total,slot,\mu\_s}_{PDCCH}$ for SCell-to-PCell cross-scheduling.

Accordingly, a terminal does not need to monitor the following PDCCH candidates(s) and/or non-overlapped CCE(s) in active DL BWP(s) of scheduling cell(s):

When a scheduling cell belongs to $N^{DL,\mu}_{cells,0}$ downlink cells, PDCCH candidates exceeding $M^{total,slot,\mu}_{PDCCH}=M^{max,slot,\mu}_{PDCCH}$ or non-overlapped CCEs exceeding $C^{total,slot,\mu}_{PDCCH}=C^{max,slot,\mu}_{PDCCH}$ per time unit (e.g., a slot) for each scheduled cell, or When a scheduling cell belongs to $N^{DL,\mu}_{cells,1}$ downlink cells, PDCCH candidates exceeding $M^{total,slot,\mu}_{PDCCH}=\gamma*M^{max,slot,\mu}_{PDCCH}$ or non-overlapped CCEs exceeding $C^{total,slot,\mu}_{PDCCH}=\gamma*C^{max,slot,\mu}_{PDCCH}$ per time unit (e.g., a slot for each scheduled cell When a scheduling cell belongs to $N^{DL,\mu}_{cells,1}$ downlink cells, PDCCH candidates exceeding $M^{total,slot,\mu}_{PDCCH}=\gamma*M^{max,slot,\mu}_{PDCCH}$ or non-overlapped CCEs exceeding $C^{total,slot,\mu}_{PDCCH}=\gamma*C^{max,slot,\mu}_{PDCCH}$ per time unit (e.g., a slot) for the same CORESET(s) as a CORESETPoolIndex value for each scheduled cell A terminal may monitor the following PDCCH candidate(s) and/or non-overlapped CCE(s) in active DL BWP(s) of scheduling cell(s).

When a scheduling cell belongs to $N^{DL,\mu}_{cells,0}$ downlink cells, $M^{total,slot,\mu}_{PDCCH}=M^{max,slot,\mu}_{PDCCH}$ or less PDCCH candidates and $C^{total,slot,\mu}_{PDCCH}=C^{max,slot,\mu}_{PDCCH}$ or less non-overlapped CCEs per time unit (e.g., a slot) for each scheduled cell, or When a scheduling cell belongs to $N^{DL,\mu}_{cells,1}$ downlink cells, $M^{total,slot,\mu}_{PDCCH}=\gamma*M^{max,slot,\mu}_{PDCCH}$ or less PDCCH candidates and $C^{total,slot,\mu}_{PDCCH}=\gamma*C^{max,slot,\mu}_{PDCCH}$ or less non-overlapped CCEs per time unit (e.g., a slot) for each scheduled cell When a scheduling cell belongs to $N^{DL,\mu}_{cells,1}$ downlink cells, $M^{total,slot,\mu}_{PDCCH}=\gamma*M^{max,slot,\mu}_{PDCCH}$ candidates and $C^{total,slot,\mu}_{PDCCH}=\gamma*C^{max,slot,\mu}_{PDCCH}$ or less non-overlapped CCEs per time unit (e.g., a slot) for the same CORESET(s) as a CORESETPoolIndex value for each scheduled cell An additional case, i.e., a case in which the cumulative sum of $N^{DL,\mu}_{cells,0}=\gamma*N^{DL,\mu}_{cells,1}$ for all $\mu$ (e.g., $\Sigma_{\mu=0}^{3}(N_{cells,0}^{DL,\mu}+\gamma \cdot N_{cells,1}^{DL,\mu}))$ exceeds $N^{cap}_{cells}$ is assumes. In this case, for both of the above-described first and second method, a value of $M^{total,slot,\mu}_{PDCCH}$ and $C^{total,slot,\mu}_{PDCCH}$ may be determined as in the following Equation 3.

$$M^{total,slot,\mu}_{PDCCH} = \left\lfloor N^{cap}_{cells} \cdot M^{max,slot,\mu}_{PDCCH} \cdot \right. \quad \text{[Equation 3]}$$

$$\left. (N^{DL,\mu}_{cells,0} + \gamma \cdot N^{DL,\mu}_{cells,1}) \middle/ \sum_{j=0}^{3} (N^{DL,j}_{cells,0} + \gamma \cdot N^{DL,j}_{cells,1}) \right\rfloor$$

$$C^{total,slot,\mu}_{PDCCH} = \left\lfloor N^{cap}_{cells} \cdot C^{max,slot,\mu}_{PDCCH} \cdot \right.$$

$$\left. (N^{DL,\mu}_{cells,0} + \gamma \cdot N^{DL,\mu}_{cells,1}) \middle/ \sum_{j=0}^{3} (N^{DL,j}_{cells,0} + \gamma \cdot N^{DL,j}_{cells,1}) \right\rfloor$$

Accordingly, a terminal does not need to monitor PDCCH candidates exceeding $M^{total,slot,\mu}_{PDCCH}$ or non-overlapped CCEs exceeding $C^{total,slot,\mu}_{PDCCH}$ per time unit (e.g., a slot) in active DL BWP(s) of scheduling cell(s) belonging to downlink cells of $N^{DL,\mu}_{cells,0}+N^{DL,\mu}_{cells,1}$.

Accordingly, a terminal may monitor $M^{total,slot,\mu}_{PDCCH}$ or less PDCCH candidates and $C^{total,slot,\mu}_{PDCCH}$ or less non-overlapped CCEs per time unit (e.g., a slot) in active DL BWP(s) of scheduling cell(s) belonging to downlink cells of $N^{DL,\mu}_{cells,0}+N^{DL,\mu}_{cells,1}$.

A second basic example is about a drop rule/priority for a PDCCH candidate/a SS set when the number of PDCCH candidates and/or the number of non-overlapped CCEs is overbooked, when a scheduling cell for a PCell, a scheduled cell, is a SCell (i.e., cross-scheduling) and a PCell (i.e., self-scheduling).

Even when SCell-to-PCell cross-carrier scheduling (CCS) is configured, PCell-to-PCell self-carrier scheduling (SCS) may be also applied to (some) common search space (CSS) set/terminal-specific search space (USS), etc. In this case, a rule/a priority related to SS set drop due to overbooking exceeding the number of non-overlapped CCEs and/or the number of PDCCH candidates (per predetermined time unit) allowed for a plurality of scheduling cells (i.e., PCell and sSCell) corresponding to a PCell, one scheduled cell, may be defined as follows.

In applying the above-described first basic example, (when $\mu\_s$ and $\mu\_p$ are different) SS set(s) to be dropped based on a pseudocode as in Table 6 may be determined for each scheduling cell (or per numerology). Here, in applying a pseudocode to $\mu\_s$ (i.e., a numerology corresponding to a SCell), a value of $M^{CSS}_{PDCCH}$ and/or $C^{CSS}_{PDCCH}$ may be 0 and (as a CSS may not exist on a SCell), it may be applied only to a SS set on a SCell scheduling a PCell (i.e., it may not be applied to a SS set on a SCell scheduling other SCells). Alternatively, without applying a pseudocode to $\mu\_s$, a terminal may expect not to exceed $\min(M^{max,slot,\mu\_s}_{PDCCH}, M^{total,slot,\mu\_s}_{PDCCH})$ or $\min(C^{max,slot,\mu\_s}_{PDCCH}, C^{total,slot,\mu\_s}_{PDCCH})$, or $\min(\gamma*M^{max,slot,\mu\_s}_{PDCCH}, M^{total,slot,\mu\_s}_{PDCCH})$ or $\min(\gamma*C^{max,slot,\mu\_s}_{PDCCH},$ $C^{total,slot,\mu\_s}{}_{PDCCH}$), or PDCCH monitoring of that excess may not be required for a terminal.

In addition, for P1=0, S1=1 in a second method of the above-described first basic example, in applying a pseudocode to μ_s (i.e., a numerology corresponding to a SCell), a drop rule may be applied (to all of SS sets on a PCell and SS sets on a SCell scheduling a PCell) only with the number of PDCCH candidates and/or non-overlapped CCEs allocated to a SCell (configured to perform cross-carrier scheduling for a PCell). As described below, in applying a pseudocode based on μ_s, when μ_p (i.e., a numerology corresponding to a PCell) and μ_s are different, a problem may occur in calculating $M^{CSS}{}_{PDCCH}$ and/or $C^{CSS}{}_{PDCCH}$ and/or $\Sigma_L M^{(L)}{}_{Suss(j)}$ and/or $C(V_{CCE}(S_{uss}(j)))$ on a PCell. For μ_s=1 (30 kHz SCS) and μ_p=0 (15 kHz SCS), a PCell facing (or overlapped) when applying a pseudocode to a specific time unit (e.g., a slot) on a SCell PCells may be some slots. In order to solve it, when a start or end symbol of a CORESET is included in a specific SCell time unit on a PCell, $M^{CSS}{}_{PDCCH}$ and/or $C^{CSS}{}_{PDCCH}$ and/or $\Sigma_L M^{(L)}{}_{Suss(j)}$ and/or $C(V_{CCE}(S_{uss}(j)))$ may be calculated for SS sets associated with a corresponding CORESET.

In other words, in applying a pseudocode as in Table 6, based on μ_s (e.g., by replacing μ with μ_s in an example of Table 6), $M^{max,slot,\mu\_s}{}_{PDCCH}$, $M^{total,slot,\mu\_s}{}_{PDCCH}$, $C^{max,slot,\mu\_s}{}_{PDCCH}$, $C^{total,slot,\mu\_s}{}_{PDCCH}$ (e.g., a value of M or C in a first basic example) may be applied and may be applied to all of SS sets on a PCell and SS sets on a SCell scheduling a PCell. Here, in calculating $M^{CSS}{}_{PDCCH}$ and/or $C^{CSS}{}_{PDCCH}$ and/or $\Sigma_L M^{(L)}{}_{Suss(j)}$ and/or $C(V_{CCE}(S_{uss}(j)))$ for a PCell, for μ_s>μ_p, when a start or end symbol of a CORESET is included in a SCell time unit (to which a corresponding pseudocode is applied) (e.g., a slot) on a PCell (or when a CORESET on a PCell is fully overlapped with a corresponding SCell time unit), the number of PDCCH candidates and/or the number of non-overlapping CCEs may be reflected on a value of $M^{CSS}{}_{PDCCH}$ and/or $C^{CSS}{}_{PDCCH}$ and/or $\Sigma_L M^{(L)}{}_{Suss(j)}$ and/or $C(V_{CCE}(S_{uss}(j)))$ on a SS set associated with a corresponding CORESET. Alternatively, in calculating a value of $M^{CSS}{}_{PDCCH}$ and/or $C^{CSS}{}_{PDCCH}$ and/or $\Sigma_L M^{(L)}{}_{Suss(j)}$ and/or $C(V_{CCE}(S_{uss}(j)))$ for a PCell, for μ_s<μ_p, the number of PDCCH candidates and/or the number of non-overlapping CCEs on a SS set corresponding to a plurality of PCell time units facing (or overlapped with) a SCell time unit (to which a corresponding pseudocode is applied) may be reflected on a value of $M^{CSS}{}_{PDCCH}$ and/or $C^{CSS}{}_{PDCCH}$ and/or $\rho_L M^{(L)}{}_{Suss(j)}$ and/or $C(V_{CCE}(S_{uss}(j)))$.

In addition, (especially, for P1=0, S1=1 in a second method of a first basic example), in applying a pseudocode to μ_s (i.e., a numerology corresponding to a SCell, a drop rule may be applied (to all SS sets on a PCell and SS sets on a SCell scheduling a PCell) only with the number of PDCCH candidates and/or non-overlapped CCEs allocated to a SCell (configured to perform cross-carrier scheduling for a PCell) and the following options may be considered for a drop rule.

Option 1: For SS set index A (configured for a PCell), when there is a restriction/a limit that PCell scheduling may be performed in only one of SS set index A on a PCell and SS set index A on a SCell through a cross-carrier scheduling configuration, apply a pseudocode in order of SS set indexes (i.e., regardless of a cell index)

Option 2: For SS set index A (configured for a PCell), when PCell scheduling may be performed in both of SS set index A on a S PCell and SS set index A on a SCell through a cross-carrier scheduling configuration:

Option 2-1: A tie breaking rule may be required for the same SS set index, and here, a higher priority is given to a specific cell index (a low cell identifier, or a high cell identifier, or a PCell or a SCell), or Option 2-2: A tie breaking rule may be required for the same SS set index, and here, a higher priority is given to a specific numerology (e.g., as a value of μ is larger or a value of μ is smaller).

Option 3: Preferentially apply drop to SS set(s) scheduled in a PCell (or a SCell) and if necessary, additionally apply drop to SS set(s) scheduled from a SCell (or a PCell)

Option 4: Preferentially apply drop to SS set(s) scheduled from a lower (or higher) SCS cell to a PCell and if necessary, additionally apply drop to SS set(s) scheduled from a higher (or lower) SCS cell to a PCell Hereinafter, more specific examples related to SCell-to-PCell CCS are described.

Figure 8:
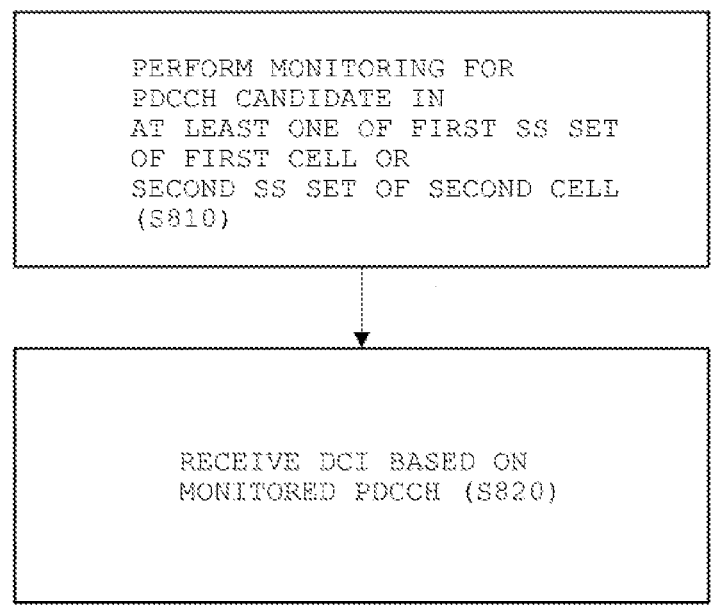
FIG. 8 is a diagram for describing a downlink control channel monitoring operation of a terminal according to an embodiment of the present disclosure.

FIG. 8 is a diagram for describing a downlink control channel monitoring operation of a terminal according to an embodiment of the present disclosure.

In S810, a terminal may perform monitoring for a PDCCH candidate in at least one of a first search space (SS) set of a first cell or a second SS set of a second cell.

For example, configuration information on at least one of a first SS set or a second SS set may be provided from a base station to a terminal.

For example, monitoring for a PDCCH candidate may receive a PDCCH candidate and include decoding try according to a downlink control information (DCI) format.

For example, a second SS set may be related to cross-carrier scheduling for a first cell. In other words, scheduling information on UL/DL transmission or reception in a first cell may be monitored through a second SS set of a second cell.

For example, when at least part of a first SS set and a second SS set is overlapped on a time domain resource unit, a first SS set may be monitored for a DCI format having CRC which is not scrambled by a specific identifier (i.e., monitoring of a first SS set may not be performed/required for a DCI format having CRC scrambled by a specific identifier). Accordingly, complexity of an operation and a burden of a terminal which should monitor scheduling information on a first cell in a plurality of cells (e.g., a first cell and a second cell) may be reduced.

When at least part of a first SS set and a second SS set is overlapped on a time domain resource unit, it may include that at least part of a time domain resource unit related to a first SS set and at least part of a time domain resource unit related to a second SS set are overlapped. It may mean that a time domain resource unit where a first SS set exists and a time domain resource unit where a second SS set exists are the same each other or any one includes the other. For example, when it is assumed that a time domain resource unit is a slot, for a first slot where a first SS set is included/exists and a second slot where a second SS set is included/exists, an overlap of at least part of a first slot and at least part of a second slot includes a case in which a first slot and a second slot are the same, or a first slot is included in a second slot, or a second slot is included in a first slot. A numerology/SCS configured for a first cell and a second cell may be the same or different, and accordingly, a length of a first slot and a length of a second slot may be the same or different. For example, a first SS set may include a common SS (CSS) and a second SS set may include a terminal-specific SS (USS).

For example, a specific identifier may include a C-RNTI. For example, a terminal may monitor DCI (or a DCI format)

which is CRC-scrambled by a SI-RNTI in a first SS set and may not monitor DCI (or a DCI format) which is CRC-scrambled by a C-RNTI.

For example, a first cell may be a PCell and a second cell may be a SCell.

For example, a time domain resource unit may be based on at least one of a symbol, a symbol group, a slot, a slot group.

Complexity reduced like this (i.e., omission of monitoring for some SS sets/DCI formats) may be applied to M or C value calculation, limit (or budget) determination, and PDCCH candidate allocation in a drop rule related to SS set monitoring of a terminal.

For example, with regard to allocation/determination of a monitored PDCCH candidate (i.e., PDCCH monitoring drop/priority), the number of PDCCH candidates (M) and the number of non-overlapped CCEs (C) may be calculated or counted based on a predetermined ratio for a first cell and a second cell (e.g., S1 and S2 for each of a first and second cell). For example, when a second cell is deactivated, S1=1 and S2=0 may be applied.

In S820, a terminal may receive DCI based on a monitored PDCCH.

Receiving DCI may include succeeding in DCI decoding. For example, a terminal may perform UL/DL transmission/reception based on UL/DL scheduling information included in received DCI.

Figure 9:
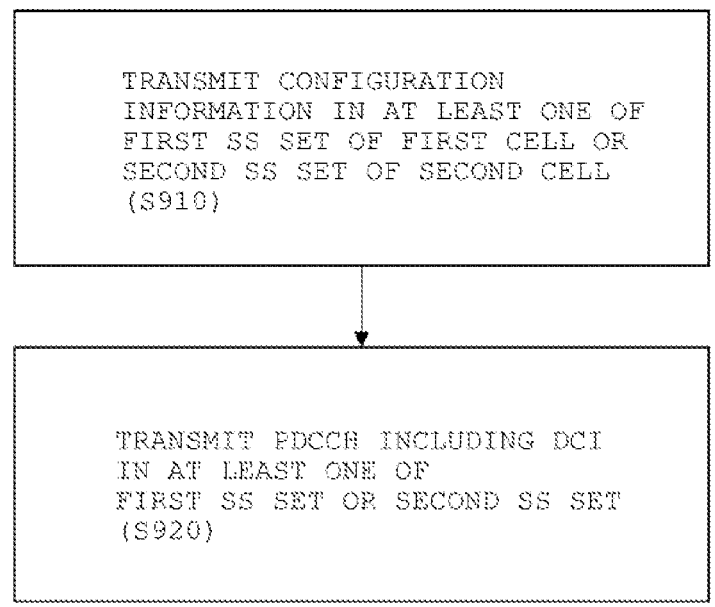
FIG. 9 is a diagram for describing a downlink control channel transmission operation of a base station according to an embodiment of the present disclosure.

FIG. 9 is a diagram for describing a downlink control channel transmission operation of a base station according to an embodiment of the present disclosure.

In S910, a base station may provide for a terminal configuration information on at least one of a first search space (SS) set of a first cell or a second SS set of a second cell.

A configured SS set is related to monitoring for a PDCCH candidate of a terminal.

For example, a second SS set may be related to cross-carrier scheduling for a first cell. In other words, scheduling information on UL/DL transmission or reception of a terminal in a first cell may be provided for a terminal through a second SS set of a second cell.

In S920, a base station may transmit a PDCCH including DCI in at least one of a first SS set or a second SS set.

For example, when at least part of a first SS set and a second SS set is overlapped in a time domain resource unit, a base station may transmit a PDCCH of a DCI format having CRC which is not scrambled by a specific identifier in a first SS set. Alternatively, although a base station transmits a PDCCH which is CRC-scrambled by a specific identifier to a terminal, a base station may not expect that a corresponding PDCCH will be monitored by a terminal.

For example, a first SS set may include a common SS (CSS) and a second SS set may include a terminal-specific SS (USS).

For example, a specific identifier may include a C-RNTI. For example, a base station may transmit DCI (or a DCI format) which is CRC-scrambled by a SI-RNTI in a first SS set and expect a terminal to monitor it and may expect that a terminal will not monitor DCI (or a DCI format) which is CRC-scrambled by a C-RNTI.

For example, a first cell may be a PCell and a second cell may be a SCell.

For example, a time domain resource unit may include at least one of a symbol, a symbol group, a slot, a slot group.

Transmitting DCI may include a subsequent operation which is based on a terminal performing an operation according to corresponding DCI. For example, a base station may expect that a terminal will perform UL/DL transmission/reception based on UL/DL scheduling information included in DCI provided for a terminal, and may perform a UL reception and DL transmission operation on a scheduled resource.

Through an example of FIG. 8 and FIG. 9, monitoring for a first SS set of a terminal may not be performed or detection of a PDCCH/DCI under a specific condition may not be tried in a first SS set. In other words, when a plurality of scheduling cells exist/are configured for one scheduled cell, a terminal may reduce a burden of monitoring both a CSS and a USS in the same time unit (e.g., a symbol/a slot, etc.) and accordingly, terminal complexity may be reduced.

A scope of the present disclosure described through the above-described examples and the after-described examples includes that examples of the present disclosure are applied when a plurality of scheduling cells exist/are configured for one scheduled cell without a limit that a scheduled cell is a PCell and a scheduling cell is a PCell and a SCell.

In addition, in the following examples, it is assumed that a first cell is a scheduled cell or a PCell and that a second cell is a scheduling cell or a SCell (or a sSCell).

In addition, as described above, a length of a time unit (e.g., a slot) may be changed according to SCS/a numerology. In the following examples, when reference SCS of multiple SCS is determined, a length of a time unit may be specified accordingly. For example, an expression of "SCS X based slot" or "mu_x based slot" means a slot having a time length which assumes that a numerology of SCS X or mu_x is applied. In addition, a value of SCS and a value of index mu therefor may be defined as in the Table 1 and examples of the present disclosure may be also applied to SCS that a value of mu is 5 or more, i.e., is larger than 240 kHz.

In addition, in the following examples, a reference time unit which calculates the number of PDCCH candidates (M), the number of non-overlapped CCEs (C), a PDCCH candidate/SS set drop rule, etc. is assumed as a slot unit. A scope of the present disclosure includes that the following examples are applied based on a predetermined time unit such as a slot group unit, a symbol unit, a symbol group unit, etc. without being limited to a time unit, a slot.

Embodiment 1

This embodiment is about a method of determining M and C based on a time unit (e.g., a slot) which is based on the minimum SCS of SCS of a first cell and SCS of a second cell. For a time unit that a SS set exists/is configured in only one of a PCell or a SCell, although SCS of a xCell (x=P or S) that a SS set exists/is configured is larger than the minimum SCS, M and C may be determined based on a time unit (e.g., a slot) which is based on SCS of a xCell, not the minimum SCS.

For example, based on a slot of the minimum SCS (e.g., mu_min) of SCell SCS (e.g., mu_s) and PCell SCS (e.g., mu_p), a mu_min based M_mu and C_mu value may be calculated and applied for each slot duration. If only a SS set configured on a cell configured as mu_x (x=p or s)>mu_min exists in a mu_min based slot duration, a M_mu and C_mu value may be calculated and applied based on mu_x (not mu_min) for each mu_x based slot belonging to a corresponding slot duration.

For example, when mu_s is 30 kHz and mu_p is 15 kHz, mu_min is 15 kHz. Accordingly, a M_mu and C_mu value may be calculated and applied based on 15 kHz for each 15 kHz based slot duration. In the present disclosure, applying a M_mu and C_mu value based on specific SCS may include determining a M_mu and C_mu value as described by referring to the Table 6.

Here, when a SS set configured on a cell (e.g., a PCell in the example) configured as SCS=mu_min exists in a mu_min (e.g., 15 kHz in the example) based slot duration, a M_mu and C_mu value may be applied based on mu_min for a corresponding slot duration. When only a SS set configured on a cell (e.g., a SCell in the example) configured as mu_x (mu_p or mu_s)>mu_min (e.g., mu_x=mu_s in the example) exists in a mu_min (e.g., 15 kHz in the example) based slot duration, a M_mu and C_mu value may be applied based on mu_x for each mu_x based slot belonging to a corresponding slot duration.

Here, when a cell corresponding to mu_min or mu_x is a SCell, in determining whether there is a SS set configured on a corresponding cell, it may be determined only for a SS set that SCell-to-PCell CCS is allowed (or that SCell-to-PCell CCS is configured/indicated).

Figure 10:
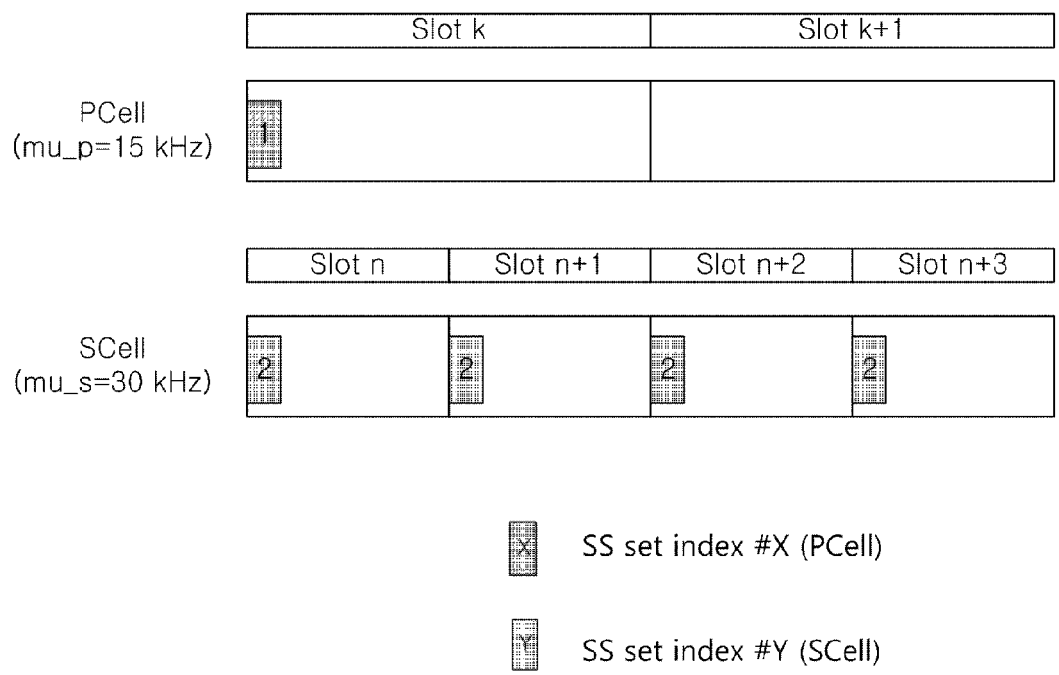
FIG. 10 to FIG. 12 are a diagram from describing application of the number of PDCCH candidates and the number of non-overlapped CCEs according to examples of the present disclosure.

FIG. 10 is a diagram from describing application of the number of PDCCH candidates and the number of non-overlapped CCEs according to an example of the present disclosure.

When mu_s is 30 kHz and mu_p is 15 kHz as in an example of FIG. 10, mu_min is 15 kHz, Basically, a 15 kHz based M_mu and C_mu value may be applied in each 15 kHz based slot duration. Specifically, a SS set (i.e., SS set index 1) configured on a cell (e.g., a PCell) configured as mu_min exists in slot k, so a SCS=mu_min (i.e., 15 kHz) based M_mu and C_mu value may be applied to a corresponding slot. Next, only a SS set configured on a cell (e.g., a SCell) configured as mu_x (mu_p or mu_s)>mu_min (e.g., mu_x=mu_s) exists in a slot k+1 duration among mu_min (e.g., 15 kHz) based slots and a configured SS set does not exist on a PCell, so a M_mu and C_mu value may be applied based on 30 kHz in slot n+2 and slot n+3.

Embodiment 2

This embodiment is about a method of determining M and C based on a time unit (e.g., a slot) which is based on SCS of a second cell (e.g., a SCell) of SCS of a first cell and SCS of a second cell. For a time unit that a SS set exists/is configured only in a first cell (e.g., a PCell), although SCS of a first cell is larger than the minimum SCS (or SCS of a second cell), M and C may be determined based on a time unit (e.g., a slot) which is based on SCS of a first cell, not the minimum SCS.

For example, based on a mu_s based slot of SCell SCS (e.g., mu_s) and PCell SCS (e.g., mu_p), a M_mu and C_mu value may be calculated and applied based on mu_s for each slot duration. If only a SS set configured in a PCell exists in a mu_min (i.e., the smaller SCS of mu_s and mu_p) based slot duration, a M_mu and C_mu value may be calculated and applied based on mu_p (not based on mu_s) for each mu_p based slot belonging to a corresponding slot duration.

For example, when mu_s is 30 kHz and mu_p is 15 kHz, a M_mu and C_mu value may be applied based on 30 kHz for each 30 kHz based slot duration.

Here, when a SS set configured in a SCell exists in a mu_min (e.g., 15 kHz in the example) based slot duration, a M_mu and C_mu value may be calculated and applied based on mu_s for a corresponding slot duration. Next, if only a SS set configured on a PCell exists in a mu_min (e.g., 15 kHz in the example) based slot duration, a M_mu and C_mu value may be calculated and applied based on mu_p for each mu_p based slot belonging to a corresponding slot duration.

Here, when a cell corresponding to mu_min or mu_x is a SCell, in determining whether there is a SS set configured on a corresponding cell, it may be determined only for a SS set that SCell-to-PCell CCS is allowed (or that SCell-to-PCell CCS is configured/indicated).

Figure 11:
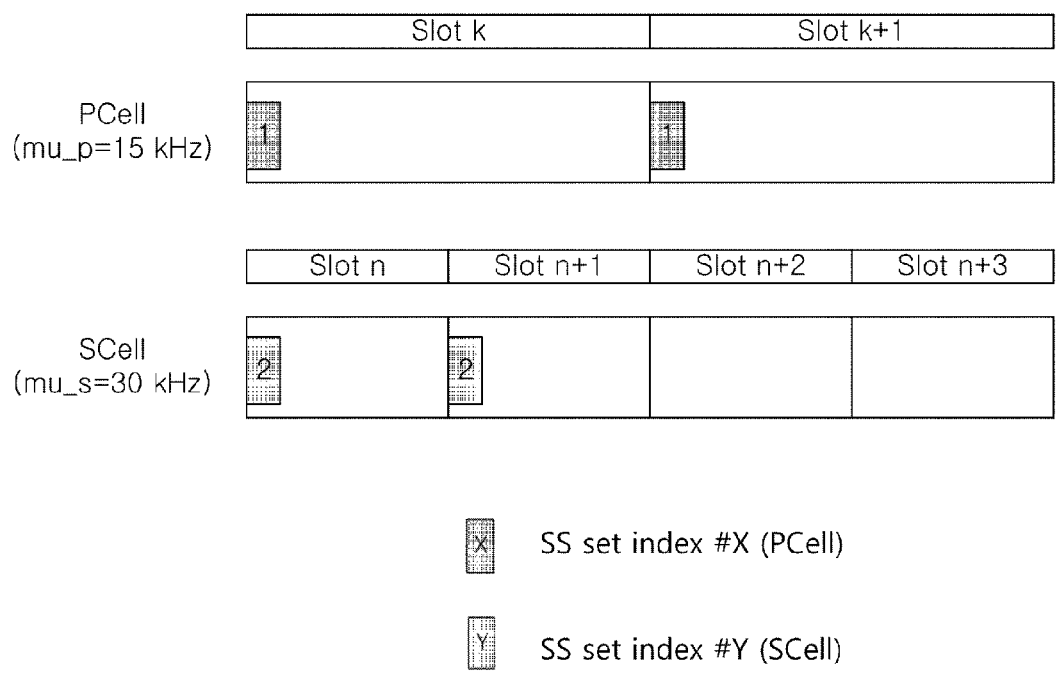

FIG. 11 is a diagram from describing application of the number of PDCCH candidates and the number of non-overlapped CCEs according to an example of the present disclosure.

When mu_s is 30 kHz and mu_p is 15 kHz as in an example of FIG. 11, mu_min is 15 kHz. Basically, a M_mu and C_mu value may be applied based on 30 kHz (i.e., based on SCell SCS) for each 30 kHz based slot duration. Specifically, a SS set (i.e., SS set index 2) configured on a SCell exists in a slot k duration among mu_min (i.e., 15 kHz) based slots, so a M_mu and C_mu value may be applied based on mu_s (i.e., 30 kHz) to a corresponding slot. Next, a SS set configured on a SCell does not exist and only a SS set (i.e., SS set index 1) configured on a PCell exists in a slot k+1 duration among mu_min (i.e., 15 kHz) based slots, so a mu_p (i.e., 15 kHz) based M_mu and C_mu value may be applied to a corresponding slot.

Additionally or alternatively, regardless of whether there is a SS set configured on a PCell for a mu_min based slot duration, based on a mu_s based slot of mu_s and mu_p, a M_mu and C_mu value may be applied based on mu_s for each slot duration.

Embodiment 2 includes a method of determining M and C based on a time unit (e.g., a slot) which is based on SCS of a first cell (e.g., a PCell) of SCS of a first cell and SCS of a second cell. For a time unit that a SS set exists/is configured only in a second cell (e.g., a SCell), although SCS of a second cell is larger than the minimum SCS (or SCS of a first cell), M and C may be determined based on a time unit (e.g., a slot) which is based on SCS of a second cell, not the minimum SCS.

For example, based on a mu_p based slot of SCell SCS (e.g., mu_s) and PCell SCS (e.g., mu_p), a M_ mu and C_mu value may be calculated and applied based on mu_p for each slot duration. If only a SS set configured in a SCell exists in a mu_min based slot duration, a M_mu and C_mu value may be applied based on mu_s for each mu_s based slot belonging to a corresponding slot duration.

Additionally or alternatively, regardless of whether there is a SS set configured on a SCell for a mu_min based slot duration, based on a mu_p based slot of mu_s and mu_p, a M_mu and C_mu value may be applied based on mu_p for each slot duration.

Embodiment 3

The present disclosure may apply a PDCCH candidate/SS set drop rule based on SCS of a second cell based on a time unit based on SCS of a second cell (or a scheduling cell or a SCell). For example, a value of M and C may be calculated and applied based on SCS of a second cell.

For example, as described in embodiment 2, based on a mu_s based slot of SCell SCS (e.g., mu_s) and PCell SCS (e.g., mu_p), a M_mu and C_mu value may be applied based on mu_s for each slot duration. Further, in applying a SS set drop rule based on a SCell SCS based slot, a specific method of applying $M^{CSS}_{PDCCH}$ and/or $C^{CSS}_{PDCCH}$ and/or $\Sigma_L M^{(L)}_{S_{uss}(j)}$ and/or $C(V_{CCE}(S_{uss}(j)))$, etc. described regarding the Table 6 is described later.

In the following description, a slot having a length based on SCS of a SCell is referred to as a SCell slot and a slot having a length based on SCS of a Pell is referred to as a PCell slot.

A SS set drop rule defined based on mu_s may be applied to each SCell slot by including the total number of PDCCH candidates and the total number of non-overlapped CCEs configured in a PCell slot overlapped with each SCell slot duration.

Figure 12:
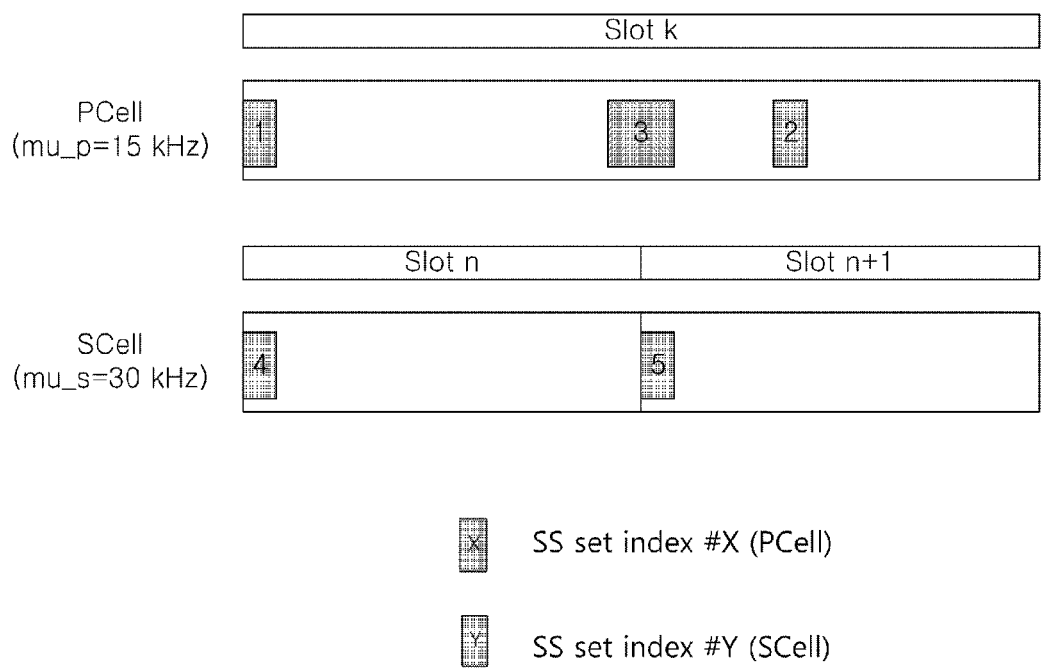

FIG. 12 is a diagram from describing application of the number of PDCCH candidates and the number of non-overlapped CCEs according to an example of the present disclosure.

When mu_s is 30 kHz and mu_p is 15 kHz as in an example of FIG. 12, mu_min is 15 kHz. Basically, a M_mu and C_mu value may be calculated and applied based on 30 kHz (i.e., based on SCell SCS) for each 30 kHz based slot duration.

Here, for a PCell, it is assumed that SS set index 1 and 3 are a CSS set and SS set index 2 is a USS set. In addition, for a SCell, it is assumed that SS set index 4 and 5 are a USS set supporting SCell-to-PCell CCS.

In this case, in applying a SS set drop rule (i.e., a pseudocode as in Table 6) for slot n, the number of PDCCH candidates and/or the number of non-overlapped CCEs corresponding to SS set index 1 and 3 configured for 15 kHz based slot k of a PCell overlapped with 30 kHz based slot n of a SCell may be determined as $M^{CSS}_{PDCCH}$ and/or $C^{CSS}_{PDCCH}$. In addition, for a value of $\Sigma_L M^{(L)}_{Suss(j)}$ and/or $C(V_{CCE}(S_{uss}(j)))$ for corresponding slot n, a value of j, an index of Suss, =2 and 4 may be applied.

In addition, in applying a SS set drop rule (i.e., a pseudocode as in Table 6) for slot n+1, the number of PDCCH candidates and/or the number of non-overlapped CCEs corresponding to SS set index 1 and 3 configured for 15 kHz based slot k of a PCell overlapped with 30 kHz based slot n of a SCell may be determined as $M^{CSS}_{PDCCH}$ and/or $C^{CSS}_{PDCCH}$. For a value of $\Sigma_L M^{(L)}_{Suss(j)}$ and/or $C(V_{CCE}(S_{uss}(j)))$ for corresponding slot n+1, a value of j, an index of Suss, =2 and 5 may be applied.

Additionally or alternatively, by including the number of PDCCH candidates and the number of non-overlapped CCEs configured in a CORESET on a PCell overlapped with a SCell slot, a M_mu and C_mu value may be applied based on mu_s for a corresponding slot. In an example of FIG. 12, in applying a SS set drop rule (i.e., a pseudocode as in Table 6) for slot n, $M^{CSS}_{PDCCH}$ and/or $C^{CSS}_{PDCCH}$ may be determined according to the number of PDCCH candidates and/or the number of non-overlapped CCEs corresponding to SS set index 1 configured in 15 kHz based slot k of a PCell overlapped with 30 kHz based slot n of a SCell (here, SS set index 3 is not considered because it is not overlapped with slot n). For a value of $\Sigma_L M^{(L)}_{Suss(j)}$ and/or $C(V_{CCE}(S_{uss}(j)))$ for corresponding slot n, j=2 and 4 may be applied. In addition, in applying a SS set drop rule (i.e., a pseudocode as in Table 6) for slot n+1, $C^{CSS}_{PDCCH}$ and/or $C^{CSS}_{PDCCH}$ may be determined according to the number of PDCCH candidates and/or the number of non-overlapped CCEs corresponding to SS set index 3 configured in 15 kHz based slot k of a PCell overlapped with 30 kHz based slot n+1 of a SCell (here, SS set index 1 is not considered because it is not overlapped with slot n+1). For a value of $\Sigma_L M^{(L)}_{Suss(j)}$ and/or $C(V_{CCE}(S_{uss}(j)))$ for corresponding slot n+1, j=5 (j=2 is already applied in slot n, so it is not considered in slot n+1) may be applied.

Embodiment 3 may include a method of applying a PDCCH candidate/SS set drop rule based on SCS of a first cell based on a time unit based on SCS of a first cell (or a scheduled cell or a PCell). For example, a value of M and C may be calculated and applied based on SCS of a first cell.

For example, based on a mu_p based slot of SCell SCS (e.g., mu_s) and PCell SCS (e.g., mu_p), a SS set drop rule may be applied to a PCell slot by applying a M_mu and C_mu value based on mu_p for each slot duration. In a more specific example, the total number of PDCCH candidates and/or the total number of non-overlapped CCEs configured in a SCell slot overlapped with each PCell slot duration may be included. Additionally or alternatively, by including the number of PDCCH candidates and/or the number of non-overlapped CCEs configured in a CORESET on a SCell overlapped with a PCell slot, $M^{CSS}_{PDCCH}$ and/or $C^{CSS}_{PDCCH}$ and/or $\Sigma_L M^{(L)}_{Suss(j)}$ and/or $C(V_{CCE}(S_{uss}(j)))$, etc. may be applied.

Embodiment 4

This embodiment is about a method of applying a M and C value for all slots for each cell. Accordingly, terminal implementation complexity for handling of a M and C value for each cell may be reduced.

For example, the number of PDCCH candidates (or the number of non-overlapped CCEs) for PDCCH CSS sets configured to be monitored in slot m on a PCell may be defined as x1(m). The number of PDCCH candidates (or the number of non-overlapped CCEs) for PDCCH USS sets configured to be monitored in slot m on a PCell may be defined as x2(m). The (total) number of PDCCH candidates (or the number of non-overlapped CCEs) for PDCCH USS sets configured to be monitored in a slot set on a SCell overlapped with slot m on a PCell may be defined as y(m). Here, a slot set on a SCell includes one SCell slot when SCS of a PCell is equal to or greater than SCS of a SCell and includes a plurality of SCell slots when SCS of a PCell is smaller than SCS of a SCell.

In addition, for PDCCH MOs (monitoring occasion) configured on a PCell and/or a SCell (PDCCHs in a corresponding PDCCH occasion may schedule data on a PCell), a value of {max of x1(m)+x2(m)}+{max of y(m)} may be configured to be Z1 or less for any slot m on a PCell. Here, {max of x1(m)+x2(m)} corresponds to the maximum value among x1(m)+x2(m) values configured in each slot for all PCell slots. And, {max of y(m)} corresponds to the maximum value among y(m) values configured in a SCell slot set overlapped with each PCell slot for all PCell slots. A Z1 value may be predefined or preconfigured/preindicated based on higher layer signaling.

Additionally or alternatively, {max of x1(m)+x2(m)} may be configured to be a Z2 value or less and {max of y(m)} may be configured to be a Z3 value or less. A Z2 and/or Z3 value may be predefined or preconfigured/preindicated based on higher layer signaling.

When PCell SCS and SCell SCS are different, uncertainty may occur in the rule. In order to solve such uncertainty, a Alt1 scheme or a Alt2 scheme may be applied. A Alt1 scheme applies the rule based on a slot (or based on a PCell slot) to each cell. A Alt2 scheme, based on a cell having the lowest SCS, applies the rule based on one slot of a corresponding cell. In this case, when there are a plurality of slots corresponding to one slot of a cell of the lowest SCS, summation of x1s, summation of x2s and summation of ys may be applied to a plurality of corresponding slots.

For example, PCell SCS may be 15 kHz, SCell SCS may be 30 kHz and a slot on a SCell facing (or overlapped with) slot m on a PCell may be slot n and slot n+1. The number of PDCCH candidates (or the number of non-overlapped CCEs) for PDCCH USS sets configured to be monitored in slot k on a SCell (PDCCHs transmitted in a corresponding PDCCH USS set may schedule data transmission or reception on a PCcell) may be defined as w(k). In this case, it may be x1(m)+x2(m)=A1, x1(m+1)+x2(m+1)=A2 and w(n)=B1, w(n+1)=B2, w(n+2)=B3, w(n+3)=B4. Here, according to Alt1, {max(A1, A2)+max(B1, B2, B3, B4)} may be configured to be a Z1 value or less and according to Alt2, {max(A1,A2)+max(B1+B2, B3+B4)} may be configured to be a Z1 value or less. Alternatively, according to Alt1, {max(B1, B2, B3, B4)} may be configured to be a Z3 value or less (and {max(A1, A2)} may be configured to be Z2 or less) and according to Alt2, {max(B1+B2, B3+B4)} may be configured to be a Z3 value or less (and {max(A1, A2)} may be configured to be Z2 or less).

In another example, PCell SCS may be 30 kHz, SCell SCS may be 15 kHz and a slot on a PCell facing (or overlapped with) slot n on a SCell may be slot m and slot m+1. The number of PDCCH candidates (or the number of non-overlapped CCEs) for PDCCH USS sets configured to be monitored in slot k on a SCell (PDCCHs transmitted in a corresponding PDCCH USS set may schedule data transmission or reception on a PCcell) may be defined as w(k). In this case, it may be x1(m)+x2(m)=A1, x1(m+1)+x2(m+1)=A2, x1(m+2)+x2(m+2)=A3, x1(m+3)+x2(m+3)=A4 and w(n)=B1, w(n+1)=B2. Here, according to Alt1, {max(A1, A2, A3, A4)+max(B1, B2)} may be configured to be a Z1 value or less and according to Alt2, {max(A1+A2, A3+A4)+ max(B1, B2)} may be configured to be a Z1 value or less. Alternatively, according to Alt1, {max(A1, A2, A3, A4)} may be configured to be a Z2 value or less (and {max(B1, B2)} may be configured to be Z3 or less) and according to Alt2, {max(A1+A2, A3+A4)} may be configured to be a Z2 value or less (and {max(B1, B2)} may be configured to be Z3 or less).

Embodiment 5

This embodiment is about a cross-scheduling method for a first cell when a second cell (or a SCell or a sSCell), a scheduling cell for a first cell (a scheduled cell or a PCell), is deactivated/dormant. In this case, (all) PDCCH monitoring of a second cell may be simply stopped due to a deactivation/dormancy state of a second cell. Additionally, it may be automatically changed to self-scheduling for a first cell (Alt1) or cross-scheduling for a first cell may be continuously monitored in a second cell (Alt2) or both self-scheduling and cross-scheduling for a first cell may be allowed and all PDCCH monitoring of a second cell may be stopped (Alt3) or a USS set of a first cell to be monitored when a second cell is activated and a USS set of a first cell to be monitored when a second cell is deactivated may be configured independently (Alt4).

When data transmission through a specific cell is not required, a corresponding cell is configured for a terminal, but it may be deactivated or transitioned to a dormancy state in order to reduce power consumption of a terminal. When it is deactivated/dormant, at least PDCCH monitoring may not be performed on a corresponding cell. Alternatively, transition into a deactivation/dormancy state may be configured/indicated through DCI or higher layer (e.g., RRC and/or MAC) signaling and when a predetermined timer value passes a predetermined standard or is expired, a terminal may be configured to perform transition for itself If cross-scheduling is configured for a terminal and a SCell (hereinafter, a sSCell) is configured as a scheduling cell for a PCell, a corresponding sSCell may be changed to a deactivation/dormancy state. In this case, when all PDCCH monitoring for a sSCell is stopped, a scheduling DCI transmission resource for a PDSCH/a PUSCH to be transmitted in a PCell may become insufficient. Specific methods for solving it are as follows.

Basically, when a sSCell is changed to a deactivation/dormancy state, all PDCCH monitoring on a corresponding sSCell (including a SS set configured for cross-scheduling for a PCell) may be stopped/omitted/OFF. In an example, when a corresponding sSCell is changed to a deactivation/dormancy state, all PDCCH monitoring for a SCell may be off, and an operation may be performed to perform PDCCH monitoring only for a SS set (configured for PCell scheduling) on a PCell for PCell scheduling. Examples which may be applied together with or instead of it are described below.

Alt1: When a corresponding sSCell is changed to a deactivation/dormancy state, a cross-scheduling configuration for a PCell may be cancelled and it may be automatically converted to self-scheduling for a PCell. In an example, when a corresponding sSCell is changed to a deactivation/dormancy state while a terminal monitors/receives information for cross-scheduling for a PCell in USS set index 2/3 (i.e., index 2, index 3 or index 2 and 3) on a sSCell, a terminal may monitor/receive information for self-scheduling for a PCell in USS set index 2/3 on a PCell.

Alt 2: A terminal operation may be defined to continuously monitor/receive information for cross-scheduling for a PCell on a corresponding sSCell although a corresponding sSCell is changed to a deactivation/dormancy state. In an example, when a corresponding sSCell is changed to a deactivation/dormancy state while a terminal monitors/receives information for cross-scheduling for a PCell in USS set index 2/3 on a sSCell, a terminal may monitor/receive only information for cross-scheduling for a PCell in USS set index 2/3 on a SCell and may not perform PDCCH monitoring other than it.

Alt 3: It may be configured to monitor a PDCCH scheduling a PCell for both a PCell and a sSCell although cross-scheduling is configured for a PCell, and when a sSCell is changed to a deactivation/dormancy state, all PDCCH monitoring for a corresponding sSCell may be off. In an example, a terminal may monitor/receive information for cross-scheduling for a PCell in USS set index 2/3 on a sSCell simultaneously with monitoring/receiving information for self-scheduling for a PCell in USS set index 2/3 on a PCell. When a corresponding sSCell is changed to a deactivation/dormancy state, all PDCCH monitoring for a sSCell may be off, but it may be still maintained to monitor/receive information for self- scheduling for a PCell in USS set index 2/3 on a PCell.

Alt 4: A USS set to be monitored in a PCell when a sSCell is activated and a USS set to be monitored in a PCell when a sSCell is deactivated/dormant may be separately configured (may be configured to be partially overlapped or not to be overlapped). In an example, USS set index 1/2/3/4 for scheduling for a PCell may be configured, a USS set to be monitored by a terminal in a PCell when a sSCell is activated may be configured as USS set index 1 and a USS to be monitored by a terminal in a PCell when a sSCell is deactivated/dormant may be configured in advance as USS set index 1/2/3/4. Subsequently, when cross-scheduling from a sSCell to a PCell is configured, a USS set index to be monitored in a PCell may be determined according to an activation/deactivation (or dormancy) state of a sSCell.

Which operation of the above-described basic operations, Alt1, Alt2, Alt3, Alt4, will be applied may be determined through signaling between a terminal and a base station. For example, an operation to be applied may be determined through capability signaling of a terminal and/or higher layer signaling (or physical layer (L1) signaling) of a base station. In an example, a base station may configure which operation of a basic operation and Alt 1 (or a basic operation and Alt 2 or a basic operation and Alt 3 or a basic operation and Alt 4) will be applied for a terminal through RRC signaling. In another example, a base station may configure which operation of Alt 1 and Alt 2 (or Alt 1 and Alt 3 or Alt 1 and Alt 4) will be applied for a terminal through RRC signaling. In another example, a base station may configure which operation of Alt 2 and Alt 3 (or Alt 2 and Alt 4 or Alt 3 and Alt 4) will be applied for a terminal through RRC signaling.

Embodiment 6

This embodiment is about a method for not performing some PDCCH monitoring for a first SS set on a first cell when a first SS set on a first cell and a second SS set on a second cell are at least partially overlapped on a time domain. For example, a first cell may be a scheduled cell (or a PCell) and a second cell may be a scheduling cell (or a sSCell). A first SS set on a first cell may include a common SS (CSS) set and a second SS set on a second cell may include a terminal-specific SS (USS) set. Some PDCCHs for a first SS set that a terminal does not perform monitoring (i.e., a terminal expects that a base station will not transmit a scheduling PDCCH) may correspond to a PDCCH which is CRC-scrambled by a specific type of identifier (e.g., a C-RNTI).

For example, when a CSS set on a PCell and a USS set (scheduling data transmission or reception on a PCell) on a sSCell are overlapped by at least 1 symbol or are configured in the same slot (based on a PCell or a sSCell), a terminal may not perform (or a terminal may omit) detection for DCI scrambled by a C-RNTI in PDCCH monitoring for a CSS set on a PCell.

It is because when a terminal monitors/receives a PDCCH of a DCI format which is CRC-scrambled by a C-RNTI at the same time from both a PCell and a sSCell at the same time (or in the same slot), for example, it may be complicated in terminal implementation by including a reception operation for a unicast PDSCH on one same cell and others.

Accordingly, for a terminal supporting (or not supporting) a specific type of terminal or specific capability, it may not be required to (simultaneously) monitor a first SS set on a PCell and a second SS set on a SCell which are at least partially overlapped in the same time duration. In addition, a corresponding terminal may not be required to monitor DCI/a PDCCH which is scrambled by a specific identifier on a PCell. In this case, a corresponding terminal may monitor a second SS set on a SCell and a first SS set on a PCell for the remaining DCI formats excluding a DCI format which is scrambled by the specific identifier in the same time duration (or at the same time).

In an additional example, it is about a method for not performing PDCCH monitoring for a first SS set on a first cell or not performing PDCCH monitoring for a second SS set on a second cell when a first SS set on a first cell and a second SS set on a second cell are at least partially overlapped on a time domain.

For example, when a CSS set on a PCell and a USS set (scheduling data transmission or reception on a PCell) on a sSCell are overlapped by at least 1 symbol or are configured in the same slot (based on a PCell or a sSCell), a terminal may not perform PDCCH monitoring in a USS set on a sSCell. Alternatively, when a CSS set on a PCell and a USS set (scheduling data transmission or reception on a PCell) on a sSCell are overlapped by at least 1 symbol or are configured in the same slot (based on a PCell or a sSCell), a terminal may not perform PDCCH monitoring in a USS set on a sSCell.

For the situation (i.e., when a SS set of two cells is at least partially overlapped in time), whether monitoring is performed in all or part of two cells, and/or for all or part of a PDCCH, may be determined based on signaling between a terminal and a base station or may be predefined without separate signaling. For example, whether PDCCH monitoring will be performed in both of two cells, whether PDCCH monitoring in some cells will not be performed, whether only PDCCH monitoring in some cells will be performed, whether a specific type of PDCCH monitoring in some cells will not be performed, or whether only a specific type of PDCCH in some cells will be monitored, etc. may be determined through a configuration/an indication through higher layer signaling (or L1 signaling) of a base station or capability signaling of a terminal. In addition, when a SS set of two cells is at least partially overlapped in time, in which cell of two cells (i.e., a scheduled cell or a scheduling cell) PDCCH monitoring will be omitted may be determined by signaling between a terminal and a base station or may be applied without separate signaling according to a predetermined rule.

Embodiment 7

This embodiment is about a method of configuring cross-scheduling related to a second cell for a specific SS set configured in a first cell. For example, for a specific SS set configured in a PCell (or a scheduled cell), cross-scheduling may be configured.

When performing PDCCH monitoring for a USS set on a sSCell having the same index as a specific SS set index configured in a PCell, there may be no USS set configuration corresponding (to a corresponding specific index) on a sSCell. In this case, a terminal may recognize that for a corresponding USS set, sSCell-to-PCell cross-scheduling is not configured and PCell-to-PCell self-scheduling is performed.

In an example, it is assumed that CSS set index 0/1 is configured in a PCell and USS set index 2/3 (for DCI format 0_1/1_1) is configured. In addition, it is assumed that USS set index 0/1/2 is configured in a sSCell. In this case, when a sSCell is configured as a scheduling cell for a PCell, scheduling DCI monitoring/reception (for cross-scheduling) for a PCell may be performed in USS set index 2 on a SCell having the same index as SS set index 2 associated with DCI format 0_1/1_1 of a PCell. In addition, when there is no SS set configuration of a sSCell corresponding to SS set index 3 of a PCell, PDCCH monitoring for SS set index 3 may be performed on a PCell (i.e., by a self-scheduling method). For CSS set index 0/1 configured in a PCell, PDCCH monitoring may be performed on a PCell (regardless of a cross-scheduling configuration configuring a sSCell as a scheduling cell).

Additionally or alternatively, when performing PDCCH monitoring for a USS set on a sSCell having the same index as a specific SS set index configured in a PCell, PDCCH monitoring for a corresponding USS set may not be performed when there is no USS set configuration corresponding (to a corresponding specific index) on a sSCell.

Such a terminal operation may be applied to a terminal having capability which performs PDCCH monitoring for a USS set only in up to one cell of two cells for the same slot (based on a PCell or a sSCell).

Embodiment 8

This embodiment is about a method of configuring a predetermined ratio per cell in calculating the number of PDCCH candidates and/or the number of non-overlapped CCEs when cross-scheduling between a first cell and a second cell is applied. For example, similar to a second method in the above-described first basic example, a limit/a budget to the number of PDCCH candidates and/or the number of non-overlapped CCEs (per slot) may be calculated by giving a certain ratio to a PCell and a sSCell.

For example, similar to the above-described first basic example, when a scheduling cell for a PCell, a scheduled cell, is configured as a SCell, a certain ratio (s1 when a scheduling cell is a PCell, s2 when a scheduling cell is a sSCell) may be given to each cell and accordingly, a value of $M^{total,slot,\mu\_p}_{PDCCH}$ and $C^{total,slot,\mu\_p}_{PDCCH}$ may be determined/calculated.

For example, a case is assumed in which a terminal has a capability to perform scheduling from a PCell and scheduling from a sSCell for a PCell. $\mu\_p$, a PCell SCS configuration, may be equal to or less than $\mu\_s$, a sSCell SCS configuration.

For $\mu\_p<\mu\_s$, a terminal may count a PCell as s1 in $N^{DL,\mu\_p}_{cells,0}$ downlink cells and count a PCell as s0 in $N^{DL,\mu\_s}_{cells,0}$ downlink cells in the cumulative sum of $N^{DL,\mu}_{cells,0}+\gamma*N^{DL,\mu}_{cells,1}$ for all $\mu$ (e.g., when $\mu$ is illustratively 0 to 3, $$\sum_{\mu=0}^{3} \left(N^{DL,\mu}_{cells,0} + \gamma \cdot N^{DL,\mu}_{cells,1}\right)$$

in determining $M^{total,slot,\mu\_p}_{PDCCH}$ and $C^{total,slot,\mu\_p}_{PDCCH}$ and determining $M^{total,slot,\mu\_s}_{PDCCH}$ and $C^{total,slot,\mu\_s}_{PDCCH}$.

For $\mu\_p=\mu\_s=\mu$, a terminal may include a PCell in $N^{DL,\mu}_{cells,0}$ downlink cells one time in determining $M^{total,slot,\mu}_{PDCCH}$ and $C^{total,slot,\mu}_{PDCCH}$.

For example, when it is assumed that CA is performed for a total of 2 15 kHz SCS cells including a 15 kHz SCS (i.e., $\mu=0$) PCell and 4 30 kHz SCS (i.e., $\mu=1$) cells (i.e., when CA is performed for 6 CCs), $N^{DL,0}_{cells,0}$ may be 2 and $N^{DL,1}_{cells,0}$ may be 4. Here, when one of 30 kHz SCS SCells is configured as a sSCell for a PCell, $N^{DL,0}_{cells,0}$ may be 1+s1 and $N^{DL,1}_{cells,0}$ may be 4+s2.

Such a s1 and s2 value may be predefined or may be configured/indicated by signaling between a base station and a terminal (e.g., terminal capability information and/or higher layer/L1 signaling of a base station). For example, a combination of a s1 and s2 value may be configured like s1=1 and s2=0; s1=1 and s2=1; s1=0.5 and s2=0.5, or s1=alpha and s2=1−alpha. Here, a value of an alpha may be predefined or may be configured/indicated by signaling between a base station and a terminal (e.g., terminal capability information and/or higher layer/L1 signaling of a base station).

By supporting a variety of s1 and/or 2 values, a ratio that a corresponding PDCCH is transmitted on a PCell and a ratio that a corresponding PDCCH is transmitted on a sSCell may be efficiently adjusted from a viewpoint that a base station transmits a PDCCH scheduling a PCell. As a result, a lack of PDCCH resources in a PCell servicing LTE/NR simultaneously may be effectively solved.

As such, in a state that a value of s1 and s2 (not s1=1, s2=0) is configured/applied, an example on a configuration/application of s1 and/or s2 when a corresponding sSCell is changed to a deactivation/dormancy state is as follows. As a terminal may not perform PDCCH monitoring on a sSCell, a rule may be configured to apply a value of s1=1, s2=0 (by ignoring a configured/applied s1/s2 value). In other words, when s2>0 is configured, PDCCH offloading may be possible on a sSCell, and when a corresponding sSCell is changed to a deactivation/dormancy state, it may be desirable to entirely perform (i.e., correspond to s2=0) PDCCH monitoring (scheduling a PCell) in a PCell by collecting a PDCCH monitoring burden which is offloaded on a sSCell. In other words, a configured s1/s2 value is applied when a sSCell is activated or is not dormant, and when a sSCell is deactivated or dormant, a value of $M^{total,slot,\mu}_{PDCCH}$ and $C^{total,slot,\mu}_{PDCCH}$ etc. may be determined/calculated by applying a value of s1=1 and s2=0 (or by ignoring a s1/s2 value and applying the same method as when sSCell-to-PCell cross-scheduling is not configured).

Next, a method of giving a ratio of P1 and S1 per cell for a first cell and a second cell is described.

Like a second method in the above-described first basic example, when a scheduling cell for a PCell, a scheduled cell, is two cells, a PCell and a SCell, the total number of scheduling cells may be maintained by giving a certain ratio (P1 (0≤P1≤1) for a PCell, S1 (0≤S1≤1) for a SCell) for each cell.

For example, when it is assumed that CA is performed for a total of 2 15 kHz SCS cells including a 15 kHz SCS (i.e., $\mu=0$) PCell and 4 30 kHz SCS (i.e., $\mu=1$) cells (i.e., when CA is performed for 6 CCs), $N^{DL,0}_{cells,X}$ may be 2 and $N^{DL,1}_{cells,X}$ may be 4 (X may be 0 or 1 and when X is omitted, it may be applied to both of X=0, 1). Here, when one of 30 kHz SCS SCells is configured as a cross-scheduling cell for a PCell, $N^{DL,0}_{cells,X}$ may be 1+P1 (or $N^{DL,0}_{cells,X}=2-P1$) and $N^{DL,1}_{cells,X}$ may be 4+S1 (or $N^{DL,1}_{cells,X}=5-S1$). Here, a value of P1 and S1 may be predefined or may be configured/indicated by signaling between a terminal and a base station.

Here, a value of P1 and/or S1 may be predefined or may be signaled between a terminal and a base station (e.g., reported by a terminal and/or configured/indicated by a base station) so that an equation of $P1+2^{mu\_s-mu\_p}*S1=1$ (or, $P1+\max\{1,2^{mu\_s-mu\_p}\}*S1=1$) will be satisfied (or so that an equation of $P1+2^{mu\_s-mu\_p}*S1\le 1$ (or, $P1+\max\{1,2^{mu\_s-mu\_p}\}*S1\le 1$) will be satisfied).

For example, for mu_s>mu_p, by reducing the number of PDCCH candidates (or the number of non-overlapped CCEs) allocated to mu_s by providing a smaller 51 value compared to a case of P1+S1=1, an increase in the total number of PDCCH candidates (or the total number of non-overlapped CCEs) of a terminal according to a sSCell configuration may be reduced.

Alternatively, there may be a limit that a value of P1 and S1 is configured so that the number of PDCCH candidates (or the number of non-overlapped CCEs) per slot will not be larger than before a sSCell-to-PCell CCS configuration (based on a PCell and a sSCell) simultaneously with P1+S1≤1.

For a value of P1 and/or S1 which is actually reported or configured by a terminal, when a relation of P1+S1<1 is established (or when a relation of P1+S1<1 may be established even regardless of an actual report/configuration value), a value of P1 and S1 may be reflected only on a numerator in calculating $M^{total,slot,\mu}_{PDCCH}$ (or $C^{total,slot,\mu}_{PDCCH}$). For example, the above-described Equation 3 may be modified as in Equation 4.

$$M^{total,slot,\mu}_{PDCCH} = \left\lfloor N^{cap}_{cells} \cdot M^{max,slot,\mu}_{PDCCH} \cdot \right.$$ [Equation 4]

$$\left. \left(\overline{N}^{DL,\mu}_{cells,0} + \gamma \cdot \overline{N}^{DL,\mu}_{cells,1}\right) \Big/ \sum_{j=0}^{3} \left(N^{DL,j}_{cells,0} + \gamma \cdot N^{DL,j}_{cells,1}\right) \right\rfloor$$

$$C^{total,slot,\mu}_{PDCCH} = \left\lfloor N^{cap}_{cells} \cdot C^{max,slot,\mu}_{PDCCH} \cdot \right.$$

$$\left. \left(\overline{N}^{DL,\mu}_{cells,0} + \gamma \cdot \overline{N}^{DL,\mu}_{cells,1}\right) \Big/ \sum_{j=0}^{3} \left(N^{DL,j}_{cells,0} + \gamma \cdot N^{DL,j}_{cells,1}\right) \right\rfloor$$

As in the above-described example, when it is assumed that CA is performed for a total of 2 15 kHz SCS cells including a 15 kHz SCS (i.e., μ=0) PCell and 4 30 kHz SCS (i.e., μ=1) cells (i.e., when CA is performed for 6 CCs), $N^{DL,0}_{cells,X}$ may be 2 and $N^{DL,1}_{cells,X}$ may be 4. Here, when one of 30 kHz SCS SCells is configured as a cross-scheduling cell for a PCell, it may be $\overline{N}^{DL,0}_{cells,X}$=1+P1 and $\overline{N}^{DL,0}_{cells,X}$=4+S1. A value of $N^{DL,0}_{cells,X}$ and $N^{DL,1}_{cells,X}$ may be the same as before a sSCell-to-PCell CCS configuration (i.e., $N^{DL,0}_{cells,X}$=2 and $N^{DL,1}_{cells,X}$=4). In addition, $N^{DL,0}_{cells,X}$ and $N^{DL,1}_{cells,X}$ in calculating $N^{cap}_{cells}$ may be the same as before a sSCell-to-PCell CCS configuration (i.e., $N^{DL,0}_{cells,X}$=2 and $N^{DL,1}_{cells,X}$=4).

Embodiment 9

This embodiment is about a default spatial parameter for a case in which sSCell-to-PCell CCS is configured.

A spatial parameter may be expressed as a DL/UL TCI state, a spatial relation RS, etc., and it may correspond to a spatial filter applied to transmission/reception of a terminal and correspond to a RS resource or beam corresponding to such a spatial filter. A RS resource or beam may include a CSI-RS resource, a SS/PBCH block (SSB), a SRS resource, etc. A spatial parameter/beam which will be applied by a terminal may be generally configured/indicated by a base station, but given time required for an operation/processing of a terminal to apply a spatial parameter configured/indicated by a base station, a default spatial parameter may be applied for a predetermined time duration. A default spatial parameter may be referred to as a default TCI state, but a scope of the present disclosure is not limited by that term. For example, an indicator for a specific TCI state which will be applied to corresponding PDSCH reception may be included in DCI acquired through a PDCCH scheduling a PDSCH. In this case, for a predetermined time duration (e.g., time required for spatial parameter switching of a terminal) after receiving PDSCH scheduling PDCCH/DCI, a terminal may perform PDSCH reception by applying a default spatial parameter/beam based on one of TCI state(s) configured for a CORESET that a corresponding PDCCH is monitored (e.g., a TCI state of a lowest index).

As described above, a default spatial parameter (or a default QCL assumption) corresponds to a QCL assumption which is applied when a time offset value between DL DCI and a PDSCH is smaller than a specific threshold (e.g., timeDurationForQCL). A method of determining such a default QCL assumption is referred to as rule#1 and specific contents thereof are as follows.

(For a single TRP) A QCL assumption associated with a CORESET corresponding to a lowest index among CORESETs monitored in a latest slot from a PDSCH is applied (rule #1-1).

For multi-DCI based multi-TRPs, a plurality of CORESET pool indexes may be configured and the rule #1-1 is applied to each CORESET pool index (rule #1-2).

For single-DCI based multi-TRPs, 2 TCI states corresponding to a lowest index among codepoints that 2 TCI states are associated with one TCI codepoint are applied as a default QCL assumption (rule #1-3).

When there is no TCI state configured by QCL type-D among TCI states corresponding to a PDSCH, an indicated TCI state is followed (rule #1-4).

Next, when cross-carrier scheduling is configured, a method of determining a default QCL assumption (i.e., a QCL assumption applied when a DL DCI-to-PDSCH offset value is smaller than timeDurationForQCL) is referred to as rule #2 and specific contents thereof are as follows.

When a default beam enable (enableDefaultBeamForCCS) parameter for CCS is not configured, a restriction is applied so that an offset between DCI-to-PDSCHs will be larger than or the same as timeDurationForQCL (here, for a beam, a beam indicated in DCI is applied) (rule #2-1).

When a enableDefaultBeamForCCS parameter is configured, a beam corresponding to a lowest ID among PDSCH TCI activated states is configured as a default beam when an offset between DCI-to-PDSCHs is smaller than timeDurationForQCL (rule #2-2).

With regard to the rule #2-1, more specifically, when a CORESET associated with a search space set for cross-carrier scheduling (CCS) is configured for a terminal and a corresponding terminal is not configured to enable default beam application for CCS (enableDefaultBeamForCCS), a corresponding terminal may expect that inclusion of a TCI field in DCI (tci-PresentInDCI) is enabled or inclusion of a TCI field in DCI format 1_2 (tci-PresentDCI-1-2) is configured for a CORESET. And, when at least one TCI state is configured for a serving cell scheduled by a search space set that a QCL-type is configured as typeD, a corresponding terminal may expect that a time offset between PDSCHs corresponding to reception of a PDCCH detected in a corresponding search space set is equal to or greater than a threshold called a time duration for QCL (timeDurationForQCL).

With regard to the rule #2-2, more specifically, when a PDCCH including scheduling DCI is received in one component carrier and a PDSCH scheduled by corresponding DCI is on other component carrier:

A time duration for QCL (timeDurationForQCL) may be determined based on subcarrier spacing of a scheduled PDSCH. For a subcarrier spacing configuration of a PDCCH (μ_PDCCH) <a subcarrier spacing configuration of a PDSCH (μ_PDSCH), an additional time delay, $d*(2^{\mu\_PDSCH}/2^{\mu\_PDCCH})$, may be added to a time duration for QCL (timeDurationForQCL) and here, d may be 0 or follow a predefined value;

When a terminal is configured to enable default beam application for CCS (enableDefaultBeamForCCS), if an offset between PDSCHs corresponding to reception of DL DCI is less than a threshold called a time duration for QCL (timeDurationForQCL) or if the DL DCI does not include a TCI field, a corresponding terminal may acquire a QCL assumption for a scheduled PDSCH from an activated TCI state having a lowest ID which may be applied to a PDSCH in an active BWP of a scheduled cell.

When sSCell-to-PCell cross-carrier scheduling is configured, the following method #1 to method #3 may be applied.

Method #1: Even when cross-carrier scheduling is configured, the rule #1 may be applied. It is because PDCCH monitoring is performed also in a PCell unlike a scheduled cell when the existing cross-carrier scheduling is configured. In this case, a terminal operation may be defined as follows.

An additional restriction indicated as <>may be applied to the rule #2-1. For example, when a CORESET associated with a search space set for cross-carrier scheduling (CCS) <for other cells excluding a SpCell, a PCell or a PSCell> is configured for a terminal and a corresponding terminal is not configured to enable default beam application for CCS (enableDefaultBeamForCCS), a corresponding terminal may expect that inclusion of a TCI field in DCI (tci-PresentInDCI) is enabled or inclusion of a TCI field in DCI format 1_2 (tci-PresentDCI-1-2) is configured for a CORESET. And, when at least one TCI state is configured for a serving cell scheduled by a search space set that a QCL-type is configured as typeD, a corresponding terminal may expect that a time offset between PDSCHs corresponding to reception of a PDCCH detected in a corresponding search space set is equal to or greater than a threshold called a time duration for QCL (timeDurationForQCL).

An additional restriction indicated as <>may be applied to the rule #2-2. If a PDCCH including scheduling DCI is received in one component carrier and a PDSCH scheduled by corresponding DCI is on other component carrier <other than a SpCell, a PCell or a PSCell>:

A time duration for QCL (timeDurationForQCL) may be determined based on subcarrier spacing of a scheduled PDSCH. For a subcarrier spacing configuration of a PDCCH ($\mu\_PDCCH$) <a subcarrier spacing configuration of a PDSCH ($\mu\_PDSCH$), an additional time delay, $d*(2^{\mu\_PDSCH}/2^{\mu\_PDCCH})$ may be added to a time duration for QCL (timeDurationForQCL) and here, d may be 0 or follow a predefined value;

When a terminal is configured to enable default beam application for CCS (enableDefaultBeamForCCS), if an offset between PDSCHs corresponding to reception of DL DCI is less than a threshold called a time duration for QCL (timeDurationForQCL) or if the DL DCI does not include a TCI field, a corresponding terminal may acquire a QCL assumption for a scheduled PDSCH from an activated TCI state having a lowest ID which may be applied to a PDSCH in an active BWP of a scheduled cell.

Method #2: Whether rule #1 will be applied or rule #2 will be applied may be configured by a higher layer parameter. A base station may configure a proper default beam according to whether a beam (or a TCI state) associated with a CORESET corresponding to a SS set monitored on a PCell will be sufficient for PDSCH reception or not.

Method #3: Whether rule #1 will be applied or rule #2 will be applied may be implicitly determined according to a SS set configuration (for PCell scheduling) which should be monitored on the sScell and Pcell. When all specific SS set types (e.g., a USS set (for DCI, not fallback DCI)) is configured to be monitored on a sSCell (without being monitored on a PCell), rule #2 may be applied. It is because unicast PDSCH reception performance may not be guaranteed only with a CORESET (e.g., CORESET#0) beam associated with a CSS set on a PCell. When part or at least one of the specific SS set types (e.g., USS sets (for DCI, not fallback DCI)) is configured to be monitored on a PCell, rule #1 may be applied.

When rule #2 is applied in the method #1 to #3, a default beam may be configured based on rule #1 (or a detailed rule thereof) if an offset between DCI-to-PDSCHs is smaller than timeDurationForQCL although a enableDefaultBeamForCCS parameter is not configured (it is referred to as a modified example of rule #2). Alternatively, whether the existing rule #2 will be applied or a modified example of rule #2 as above will be applied may be configured by a higher layer parameter.

According to the above-described various examples of the present disclosure, when a PDCCH resource scheduling uplink or downlink data which will be transmitted in a first cell is insufficient, a monitoring burden of a terminal may be reduced in supporting SCell-to-PCell CCS scheduling corresponding data not only in a first cell, but also in a second cell.

Figure 13:
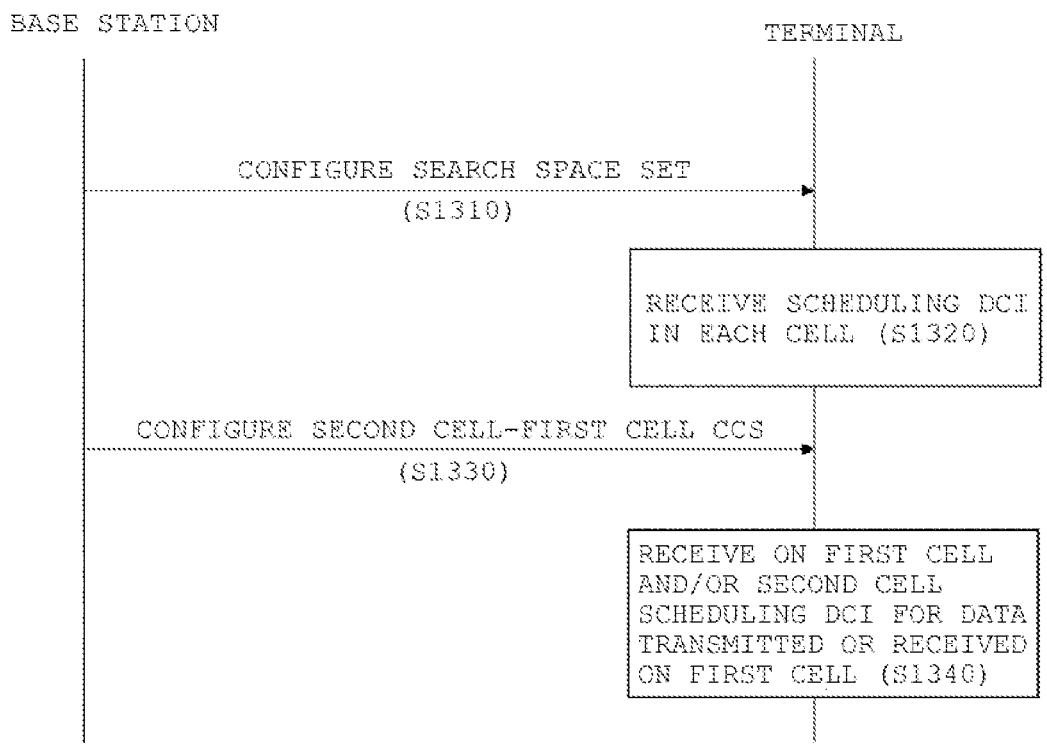
FIG. 13 is a diagram for describing a signaling procedure between a terminal and a base station according to an embodiment of the present disclosure.

FIG. 13 is a diagram for describing a signaling procedure between a terminal and a base station according to an embodiment of the present disclosure.

In S1310, a base station may provide configuration information on a search space set to a terminal. For example, a terminal may be configured with SS sets for a first cell and a second cell from a base station.

In S1320, a terminal may receive DCI based on a SS set configured in a first cell and a second cell, respectively. DCI reception may include PDCCH monitoring in a SS set. For example, scheduling DCI for data transmission or reception on a first cell may be received through PDCCH monitoring on a first SS set configured for a first cell. Scheduling DCI for data transmission or reception on a second cell may be received through PDCCH monitoring on a second SS set configured for a second cell.

In S1330, a base station may provide second cell-first cell CCS configuration information for a terminal. For example, a terminal may configure a scheduling cell for a first cell, a scheduled cell, as a second cell and may receive configuration information on SS set(s) on a second cell related to it.

In S1340, a terminal may receive scheduling DCI for data which is transmitted or received on a first cell through PDCCH monitoring in a SS set on a first cell and may receive it through PDCCH monitoring in a SS set on a second cell. In addition, scheduling DCI for data transmission or reception on a second cell, like S1320, may be received through PDCCH monitoring on a second SS set configured for a second cell.

In an example of FIG. 13, when a first cell (e.g., a PCell) and a second cell (e.g., a SCell) are configured through carrier aggregation (CA) from a viewpoint of a terminal, a SS set configuration may be received from each cell. Accordingly, a terminal may receive a PDCCH scheduling a PDSCH/a PUSCH in a PCell in a PCell and a PDCCH scheduling a PDSCH/a PUSCH in a SCell in a SCell. When a cross-carrier scheduling (CCS) configuration that a scheduling cell for a PCell is configured as a SCell is received, a terminal may receive a PDCCH scheduling a PDSCH/a PUSCH in a PCell in a PCell and/or a SCell.

Here, in order to reduce a PDCCH monitoring burden of a terminal, when a SS set on a PCell and a SS set on a SCell are at least partially overlapped in a time domain (or exist in the same slot), PDCCH monitoring for a specific type of DCI (e.g., DCI which is CRC-scrambled by a C-RNTI) may not be performed on a PCell.

In addition, in applying a drop rule for a SS set to avoid exceeding the number of PDCCH candidates and/or the maximum number of non-overlapped CCEs allowed per predetermined time unit (e.g., a slot), a rule based on SCS/a numerology/a MO configured in a specific slot, etc. for a PCell and a SCell may be applied.

With regard to FIG. 13, each or a combination of two or more of the above-described various examples of the present disclosure may be applied and an overlapped description is omitted.

General Device To Which The Present Disclosure May Be Applied

Figure 14:
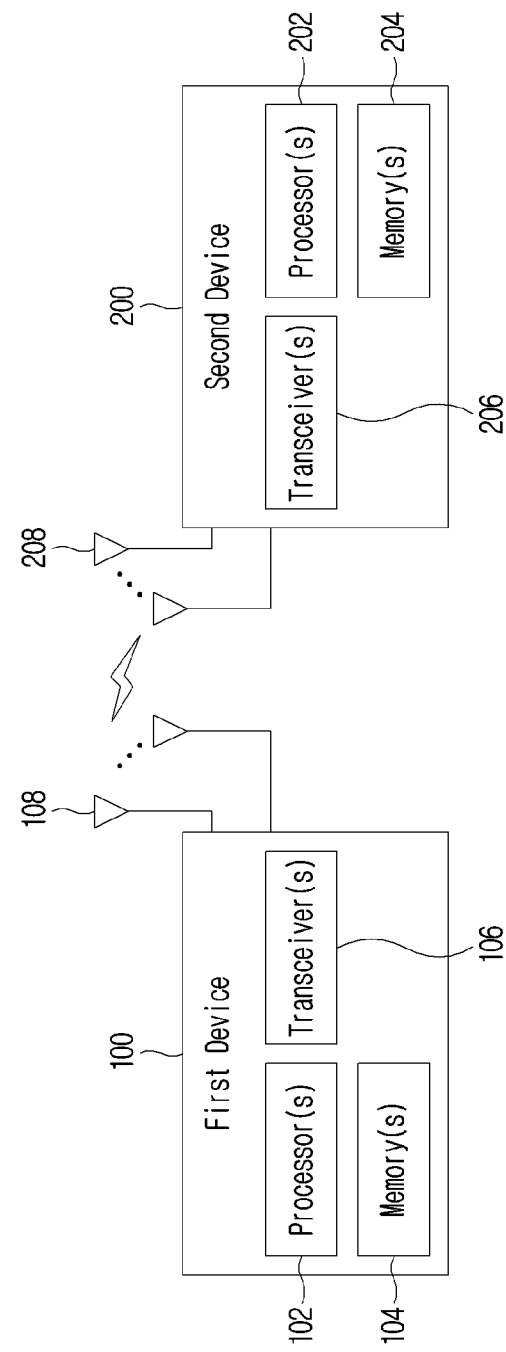
FIG. 14 is a diagram which illustrates a block diagram of a wireless communication system according to an embodiment of the present disclosure.

FIG. 14 is a diagram which illustrates a block diagram of a wireless communication system according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a user equipment (UE) in a wireless communication system, the method comprising:

transmitting, to a network, UE capability information related to no simultaneous monitoring between UE-specific search space (USS) sets on a secondary cell (SCell) and common search space (CSS) sets on a primary cell (PCell) for a downlink control information (DCI) format with cyclic redundancy check(CRC)-scrambled by a specific identifier including a Cell-Radio Network Temporary Identifier (C-RNTI), in an overlapping slot of the PCell and the SCell;

receiving, from the network, a physical downlink control channel (PDCCH) candidate and obtaining DCI based on a DCI format, wherein the UE is configured for cross-carrier scheduling for uplink transmission or downlink reception on the PCell from the SCell.

2. The method according to claim 1, wherein the UE capability information is further related to simultaneous monitoring of the USS sets on the SCell and the CSS sets on the PCell for a DCI format with CRC not scrambled by the specific identifier, in the overlapping slot of the PCell and the SCell.

3. The method according to claim 1, wherein:

with regard to count of at least one of a number of PDCCH candidates or the number of non-overlapped control channel elements (CCE), a predetermined ratio for the PCell and the SCell is applied.

4. The method according to claim 3, wherein:

the predetermined ratio is s1 and s2 respectively for the PCell and the SCell and 0≤s1≤1, 0≤s2≤1, s1+s2=1.

5. The method according to claim 4, wherein:

on a basis that the SCell is deactivated, s1=1 and s2=0.

6. A user equipment (UE) in a wireless communication system, the UE comprising:

at least one transceiver; and at least one processor connected to the at least one transceiver, wherein the at least one processor is configured to:

transmit, through the at least one transceiver, to a network, UE capability information related to no simultaneous monitoring between UE-specific search space (USS) sets on a second cell (SCell) and common search space (CSS) sets on a primary cell (PCell) for a downlink control information (DCI) format with cyclic redundancy check(CRC)-scrambled by a specific identifier including a Cell-Radio Network Temporary Identifier (C-RNTI), in an overlapping slot of the PCell and the SCell;

receive, through the at least one transceiver, from the network, a physical downlink control channel (PDCCH) candidate and obtaining DCI based on a DCI format, wherein the UE is configured for cross-carrier scheduling for uplink transmission or downlink reception on the PCell from the SCell.

7. A base station in a wireless communication system, the base station comprising:

at least one transceiver; and at least one processor connected to the at least one transceiver, wherein the at least one processor is configured to:

receive, through the at least one transceiver, from a user equipment (UE), UE capability information related to no simultaneous monitoring between UE-specific search space (USS) sets on a second cell (SCell) and common search space (CSS) sets on a primary cell (PCell) for a downlink control information (DCI) format with cyclic redundancy check(CRC)-scrambled by a specific identifier including a Cell-Radio Network Temporary Identifier (C-RNTI), in an overlapping slot of the PCell and the SCell;

transmit, through the at least one transceiver, to the UE, a physical downlink control channel (PDCCH) including DCI, wherein the UE is configured for cross-carrier scheduling for uplink transmission or downlink reception on the PCell from the SCell.

* * * * *